(12) United States Patent
Okamoto

(10) Patent No.: US 6,572,660 B1
(45) Date of Patent: Jun. 3, 2003

(54) METHOD AND SYSTEM FOR CREATING HYPERLINKS AND HYPERLINKED DOCUMENTS FROM THE DIRECT MANIPULATION OF INFORMATION ("DRAG AND LINK" OPERATION)

(76) Inventor: Russell I. Okamoto, 15495 NW. Barkton St., Beaverton, OR (US) 97006

( * ) Notice: Subject to any disclaimer, the term of this patent is extended or adjusted under 35 U.S.C. 154(b) by 0 days.

(21) Appl. No.: 09/378,163

(22) Filed: Aug. 18, 1999

Related U.S. Application Data

(60) Provisional application No. 60/097,422, filed on Aug. 20, 1998.

(51) Int. Cl.[7] ................................................ G06F 17/00
(52) U.S. Cl. ..................... 715/500.1; 715/531; 715/539; 715/513; 715/501.1; 345/769
(58) Field of Search .......................... 345/769; 707/531, 707/539, 513, 501.1

(56) References Cited

U.S. PATENT DOCUMENTS

| | | | |
|---|---|---|---|
| 5,157,763 A | * 10/1992 | Peters et al. ................. 345/769 |
| 5,630,080 A | * 5/1997 | Malamud et al. ........... 345/769 |
| 5,867,144 A | * 2/1999 | Wyard ......................... 345/769 |
| 6,097,841 A | * 8/2000 | Gunji et al. ................. 382/229 |
| 6,233,591 B1 | * 5/2001 | Sherman et al. ......... 707/501.1 |
| 6,380,956 B1 | * 4/2002 | Yee et al. .................... 345/769 |

OTHER PUBLICATIONS

WebCom Guide, 'Hot Link', 1997, p. 1.*

* cited by examiner

*Primary Examiner*—Joseph H. Feild
*Assistant Examiner*—Rachna Singh

(57) ABSTRACT

A method and system for creating hyperlinks and hyperlinked documents from the direct manipulation of information in a hypermedia processing system, or the like, in a fashion that requires little effort on the part of the user. A user can effortlessly create hyperlinks and hyperlinked documents in one seamless motion by simply pressing a predetermined key while dragging and dropping source-visual elements such as a text element onto target visual elements such as another text element. The method and system is defined herein as a "drag and link" operation, enabling the user to create hyperlinks and hyperlinked documents from the direct manipulation of information with the familiar ease of the conventional drag and drop operation.

20 Claims, 21 Drawing Sheets

Microfiche Appendix Included
(1 Microfiche, 45 Pages)

Sticky6

Favorite quotes from anonymous sources

70

History is outdated.
Beneath the scherzo, I hear the death knell.
She's a drug; a heroine; a heroin.

METHOD AND SYSTEM FOR CREATING HYPERLINKS AND HYPERLINKED DOCUMENTS FROM THE DIRECT MANIPULATION OF INFORMATION ("DRAG AND LINK" OPERATION)

CROSS-REFERENCE TO RELATED APPLICATIONS

This application is entitled to the benefit of Provisional Patent Application Ser. No. 60/097,422 filed Aug. 20, 1998.

REFERENCE TO MICROFICHE APPENDIX

To meet requirements of full disclosure, a computer program listing of the object code for a hypermedia processing system that implements the processing logic of the preferred embodiment appears on a single microfiche including 45 frames.

BACKGROUND

1. Field of Invention

The present invention relates generally to computer processing systems, and more particularly, to the direct manipulation of information by users to easily create hyperlinks and hyperlinked documents.

2. Description of Prior Art

Present hypermedia processing systems provide a cumbersome method of creating hyperlinks and hyperlinked documents. For example, to create a hyperlink within a current document using a typical prior art system, a user is required to 1) first create a new document that will serve as the destination of the hyperlink; 2) in the current document, highlight a string of text specifying the location of the hyperlink; 3) select a menu or toolbar command that displays a-file selection dialog box; 4) enter the new document as the destination of the hyperlink in the dialog box; 5) press a button in the dialog box that closes the dialog box and saves the new document as the destination of the hyperlink.

SUMMARY

The present invention provides a method and system for creating hyperlinks and hyperlinked documents from the direct manipulation of information in a hypermedia processing system, or the like, in a fashion that requires little effort on the part of the user. In accordance with the present invention, the user can effortlessly create hyperlinks and hyperlinked documents in one seamless motion by simply pressing a predetermined key, such as the Shift key, while dragging and dropping source-visual elements such as a text element onto target visual elements such as another text element. The present invention. defines the method and system herein as a "drag and link" operation, enabling the user to create hyperlinks and hyperlinked documents with the familiar ease of the conventional drag and drop operation. Thus, the present invention defines a method and system for easily creating hyperlinks and hyperlinked documents from the direct manipulation of information that is vastly simpler than the cumbersome process implemented by prior art systems.

OBJECTS AND ADVANTAGES

Accordingly, several objects and advantages of the present invention are:

(a) direct manipulation of information for convenience and speed;

(b) creates hyperlinks and hyperlinked documents in one seamless user interface operation rather than in multiple cumbersome steps as required in prior art systems;

(c) automatically creates new documents on the fly as needed;

(d) automatically creates hyperlinks connecting user-specified drop targets to newly created documents;

(e) automatically titles newly created documents.

Further objects and advantages of the present invention will become apparent from a consideration of the drawings and ensuing description.

DESCRIPTION OF THE DRAWINGS

FIGS. 5–13 illustrate the operation of the preferred embodiment.

DESCRIPTION OF PREFERRED EMBODIMENT

The preferred main embodiment of the present invention provides a method and system for creating hyperlinks and hyperlinked documents from the direct manipulation of information in a hypermedia processing system, or the like, in a fashion that requires little effort on the part of the user. In accordance with the present invention, the user can effortlessly create hyperlinks and hyperlinked documents by simply pressing a predetermined key, such as the Shift key, while dragging and dropping source-visual elements such as a text element onto target visual elements such as another text element. The present invention defines the method and system herein as a "drag and link" operation, enabling the user to create hyperlinks and hyperlinked documents with the familiar ease of the conventional drag and drop operation. The present invention thus defines a method and system for easily creating hyperlinks and hyperlinked documents from the direct manipulation of information that is vastly simpler than the cumbersome process implemented by prior art systems. The following detailed description describes the preferred embodiment of the present invention. In the following description, numerous specific details are set forth in order to provide a thorough understanding of the present invention. In other instances, well-known techniques and structures are not shown in detail to avoid obscuring the present invention.

The preferred embodiment of the present invention is implemented on a computer processing system suitable for running the Microsoft Windows 95, Microsoft Windows 98, or Microsoft Windows NT 4.0 operating system and equipped with a color video display screen, keyboard, and mouse or suitable alternative pointer input device. Users skilled in the art will notice that alternative computer processing systems may be employed.

Figure 1:
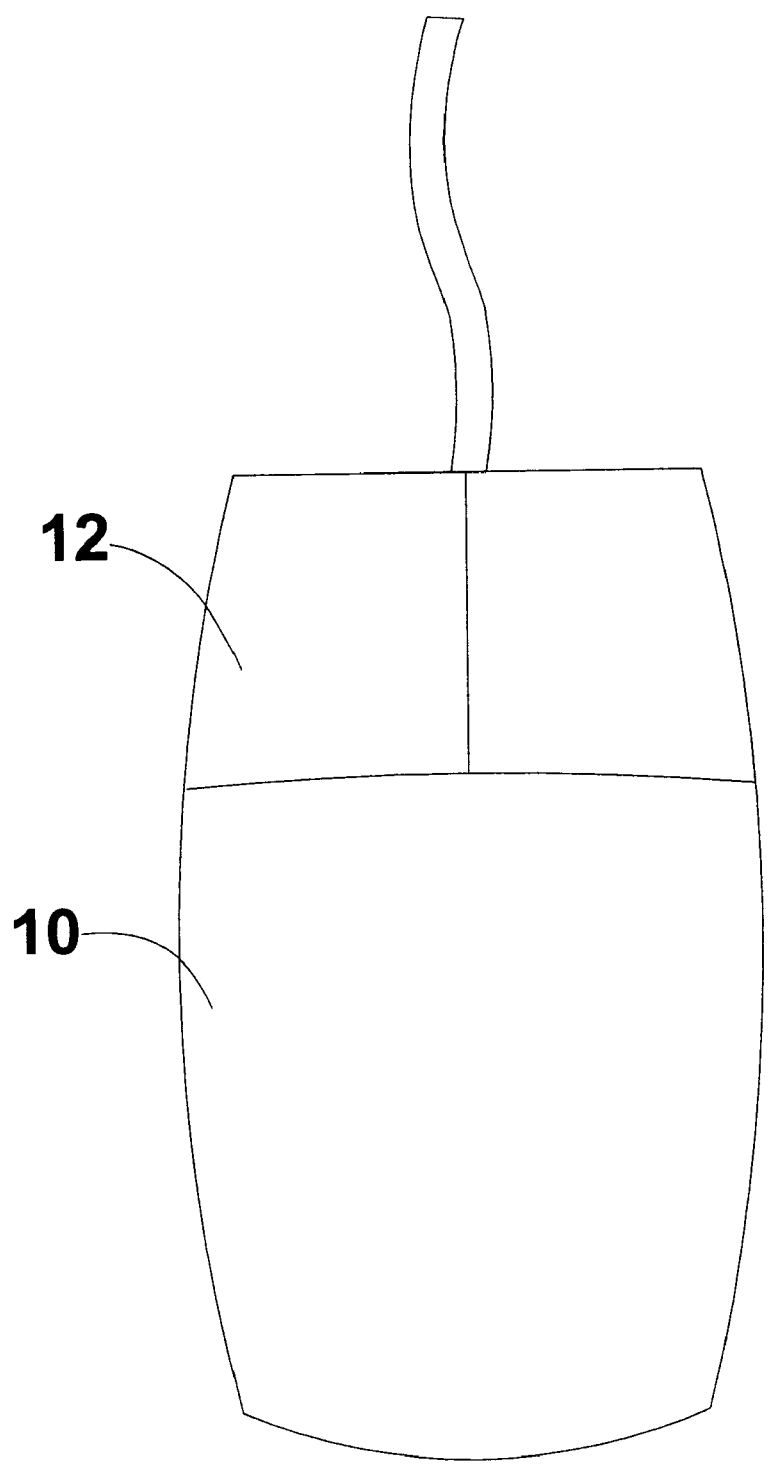
FIG. 1 is a diagram of a two-button mouse used in the preferred embodiment of the present invention.

FIG. 1 shows an example input device, a mouse 10, that is suitable for practicing the preferred embodiment of the present invention. A primary mouse button 12 is included and a roller ball (not shown) is provided on the underside of the mouse 10 to generate directional commands as the mouse rolls along a flat surface. Users skilled in the art will notice that other input devices, such as a pen based stylus, are similarly suitable for practicing the preferred embodiment of the present invention.

Figure 2:
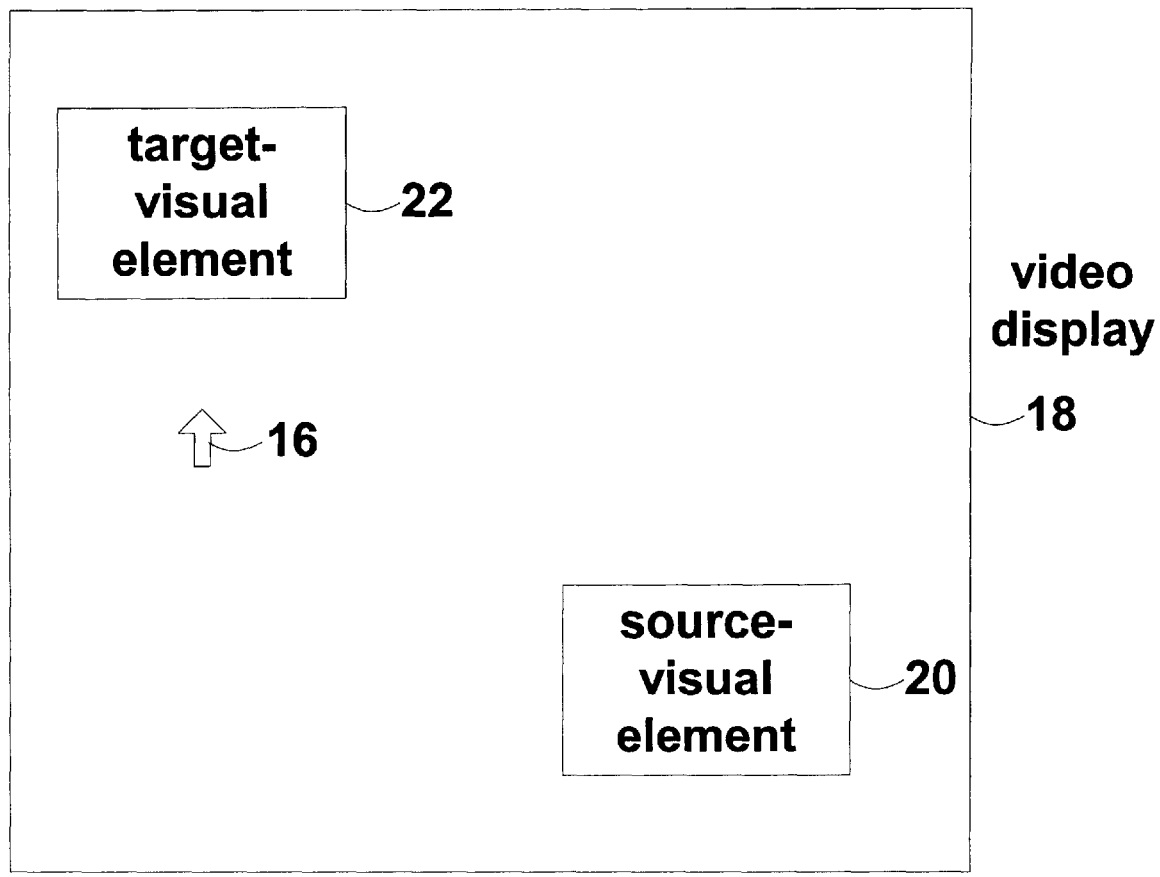
FIG. 2 is a diagram depicting a pointer and visual elements displayed on a video display.

As illustrated in FIG. 2, the movement of the mouse 10 is translated into the movement of a pointer 16 on a video display 18. FIG. 2 also depicts visual elements represented on the video display 18, showing a source-visual element 20 associated with a source object and a target-visual element 22 associated with a target object. These visual elements may be directly manipulated.

Figure 3:
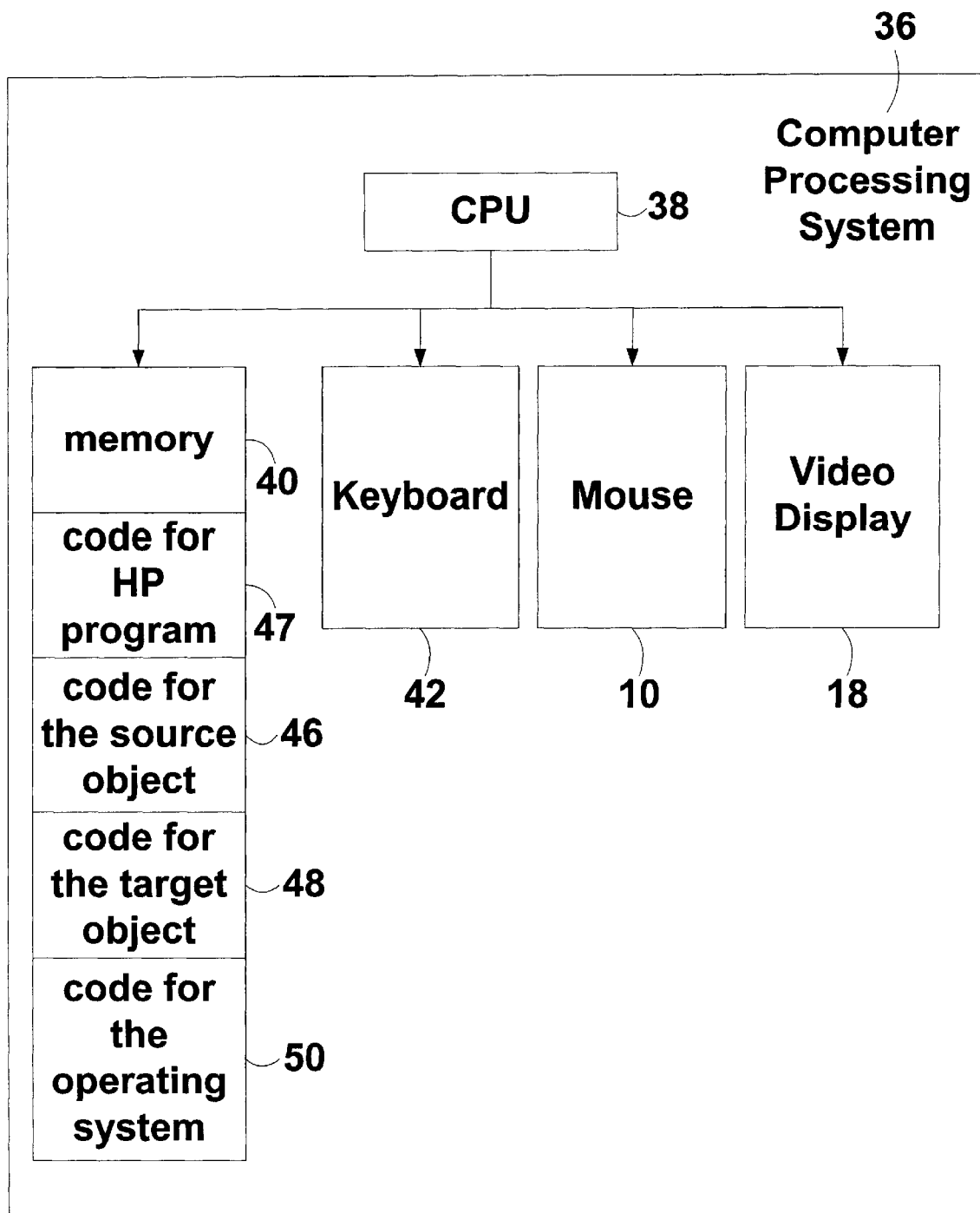
FIG. 3 is a block diagram of a computer processing system suitable for practicing the preferred embodiment of the present invention.

FIG. 3 shows a block diagram of an illustrated computer processing system for practicing the preferred embodiment of the present invention. The computer processing system 36 includes a central processing unit (CPU) 38, a memory 40, a keyboard 42, a video display 18 and a conventional mouse 10. The memory 40 holds code for a hypermedia processing (HP) system 47. In addition, code for the source object 46 associated with the source-visual element, code for the target object 48 associated with the target visual element, and code for the operating system 50 are stored within the memory 40.

Operation of Preferred Embodiment

The processing logic of the preferred embodiment is implemented by a rhypermedia processing system 47 running as a computer program in a computer processing system 36 as described above. To meet requirements of full disclosure, the present invention includes a computer program listing of the object code of the hypermedia processing system 47. The computer program listing appears in microfiche format and has been generated by compressing the program object code and then converting it to printable format. Specifically, the object code has been compressed using the WinZip version 6.3 utility and then converted to printable format using the UNIX uuencode utility. To extract an electronic file version of the computer program listing into object code, the file may be both decoded and decompressed using the WinZip version 6.3 utility. This process of extraction will be familiar to those skilled in the art. The hypermedia processing system is implemented using the Microsoft Win32 API and Microsoft Visual C++4.0. Once fully extracted, the program object code can be readily executed on a computer suitable for running the Microsoft Windows 95, Microsoft Windows 98, or Microsoft Windows NT 4.0 operating system.

Figure 4:
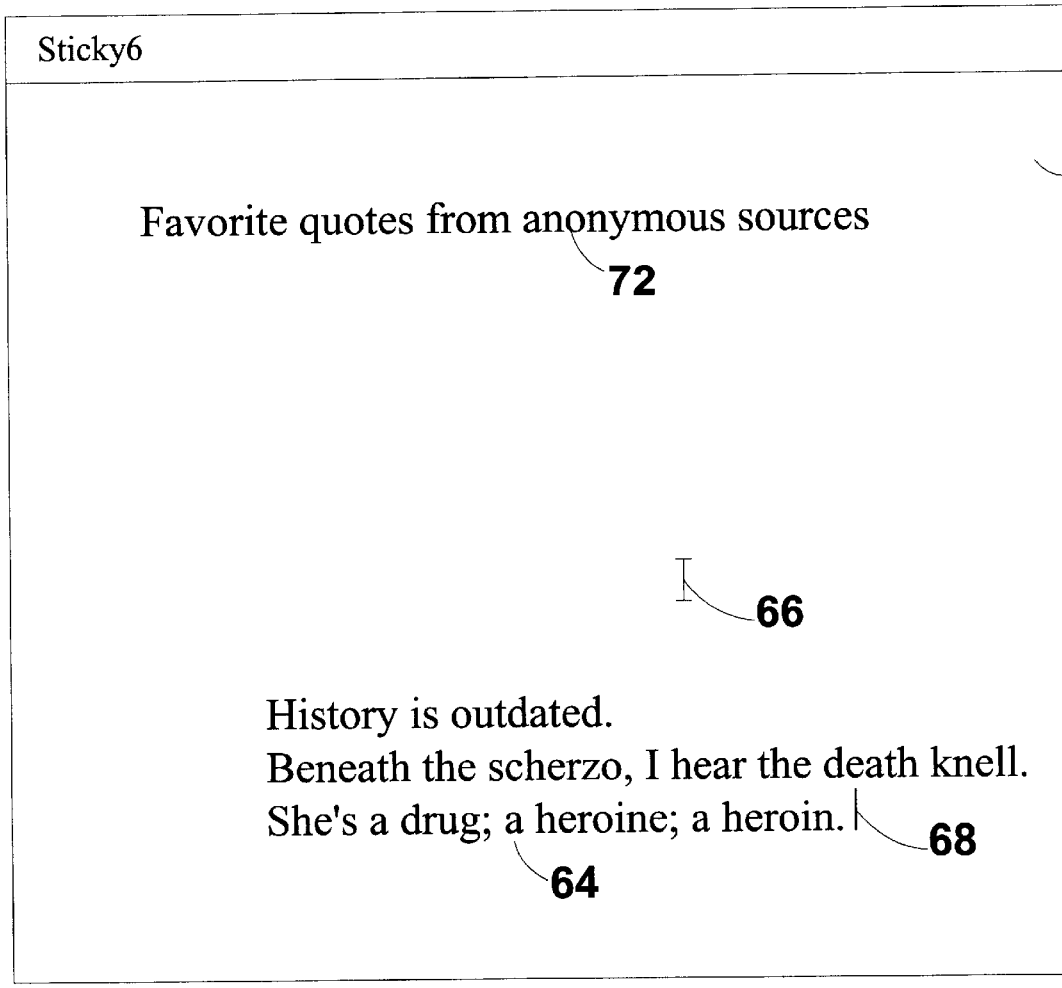
FIG. 4 is a picture of a hypermedia processing window known as a sticky.

FIG. 4 shows a hypermedia processing window 60 associated with a document created by the hypermedia processing system 47 suitable for practicing the preferred embodiment of the present invention. In the hypermedia processing window, the user may place visual elements associated with hypermedia objects, such as text elements, anywhere on the window in a free form manner. Such a window is known in this hypermedia processing system as a sticky. FIG. 4 shows two free-form text elements 72 and 64 placed on the sticky 60. FIG. 4 also shows a pointer 66 and an insertion point 68 within a text element as the user sees them on the display screen 18. The mouse 10 (FIG. 1) is used to position the pointer 66 over source-visual elements such as text/data displayed on the display screen 18. Using common mouse selection techniques, any visual element can be selected and highlighted by the user.

The preferred embodiment of the present invention, known as the drag and link operation, exploits the familiar ease of the well-known conventional drag and drop operation. Users skilled in the art will recognize the similarities between the drag and link operation and the conventional drag and drop operation and appreciate how these similarities contribute to the ease of use of the present invention. Users skilled in the art will also appreciate the differences between the drag and link operation and the conventional drag and drop operation and appreciate the novel utility of the present invention, enabling users to effortlessly create hyperlinks and hyperlinked documents from the direct manipulation of information.

The drag and link operation begins just like a conventional drag and drop operation where the user first selects a source-visual element. As shown in FIG. 5, the drag and link operation begins when the user selects a source-visual element 70, in this case, a text element selection. FIG. 5 also depicts the new shape of the pointer 66 as the pointer is positioned over the selected source-visual element 70. In the preferred embodiment of the present invention, the pointer 66 takes the shape of a slanted arrow while it is positioned over the selected source-visual element 70. In accordance with conventional mouse deselection techniques, if the primary mouse button 12 (FIG. 1) is depressed when the pointer 66 is not over any part of the selected source-visual element 70, the selection is canceled.

Figure 6:
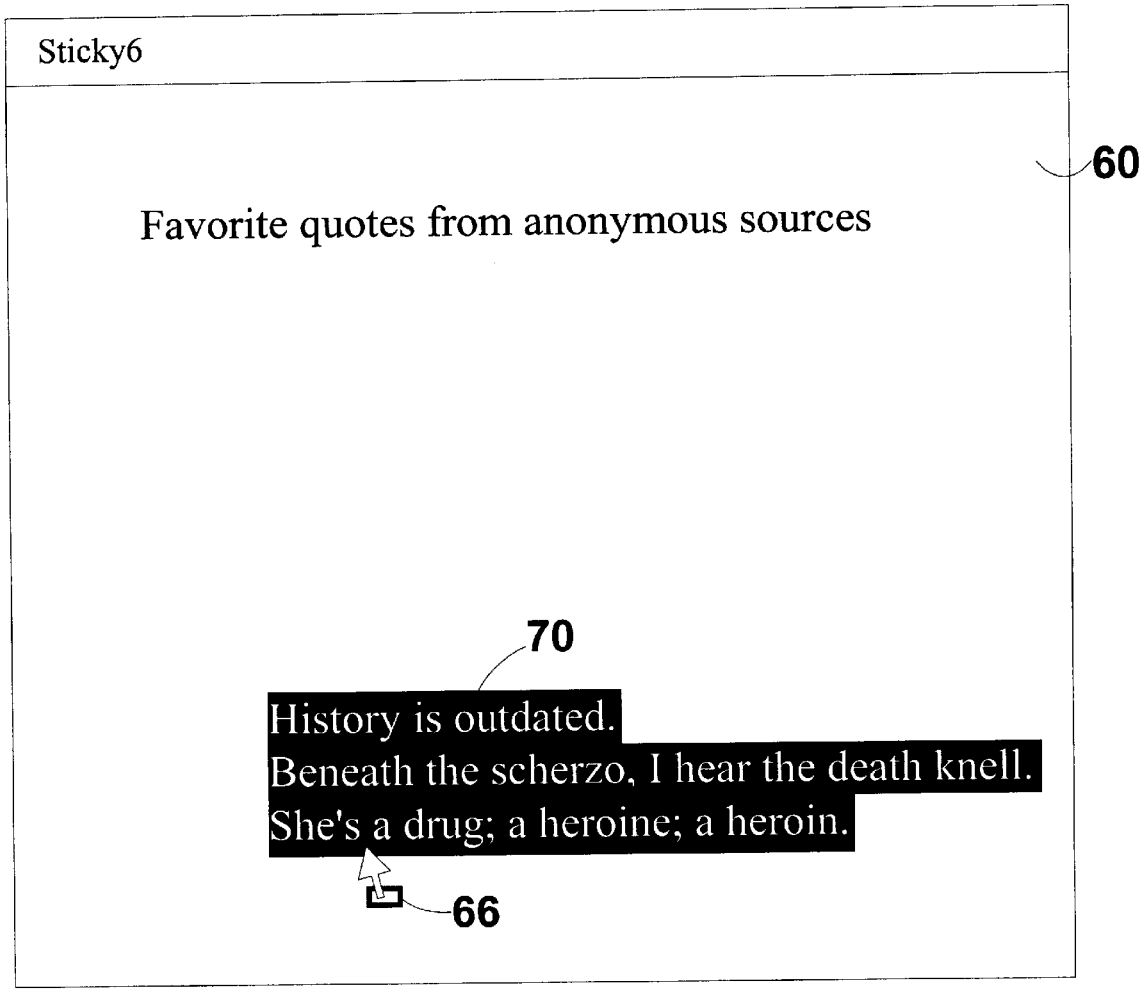

The drag and link operation continues in FIG. 6 which shows the new shape of the pointer 66 after the user activates a first predetermined signal, defined herein by depressing the primary mouse button 12 (FIG. 1), while the pointer 66 is positioned over the selected source-visual element 70. In the preferred embodiment of the present invention, the pointer takes the shape of a slanted arrow coming out of a dash-lined square when the primary mouse button 12 is depressed while the pointer 66 is positioned over the selected source-visual element 70.

Figure 7:
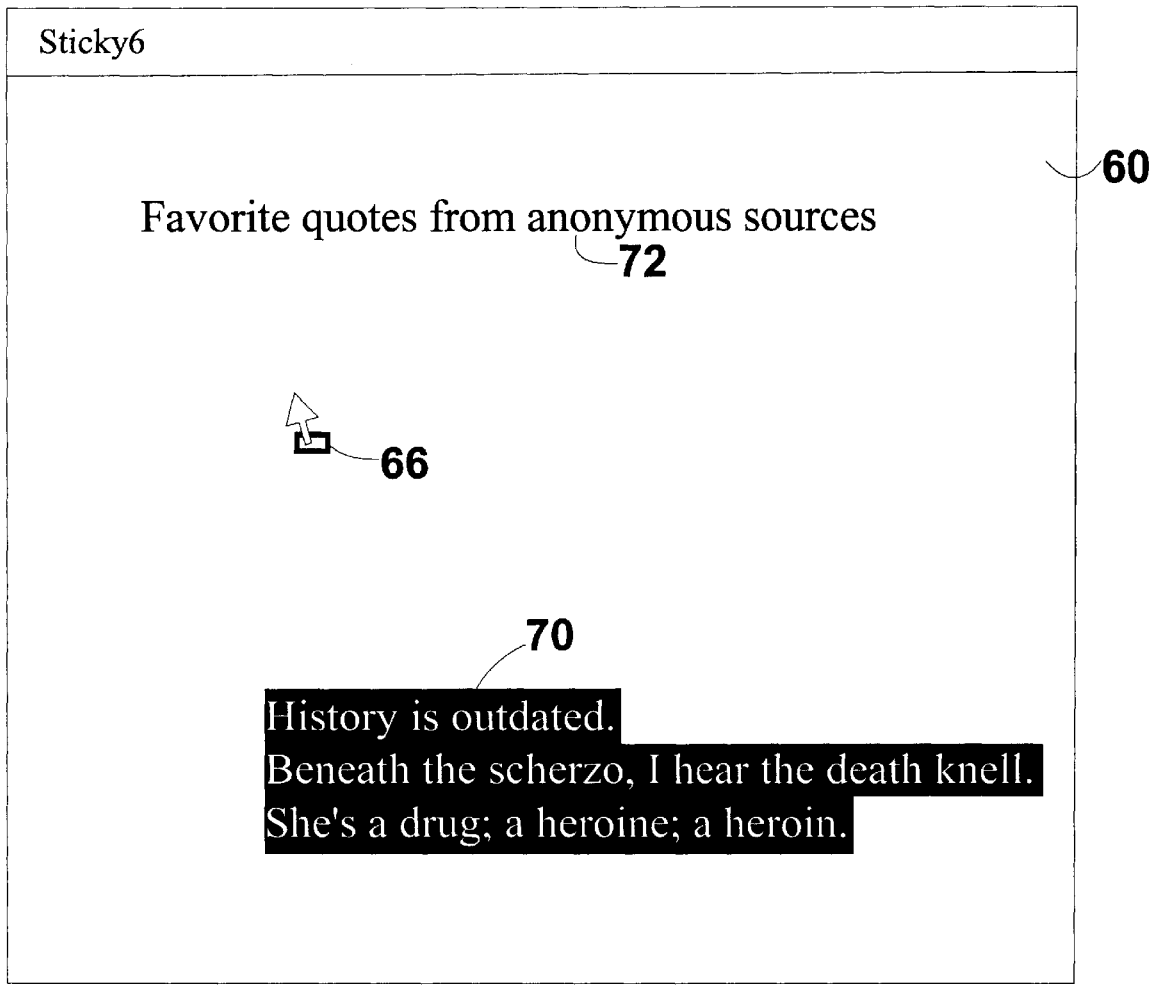

FIG. 7 illustrates the display screen as the user continues the operation and drags the pointer 66 toward a target-visual element 72, in this case another text area-visual element. Users skilled in the art will notice that up to this point, the steps of the drag and link operation are similar to the conventional drag and drop operation.

Figure 8A:
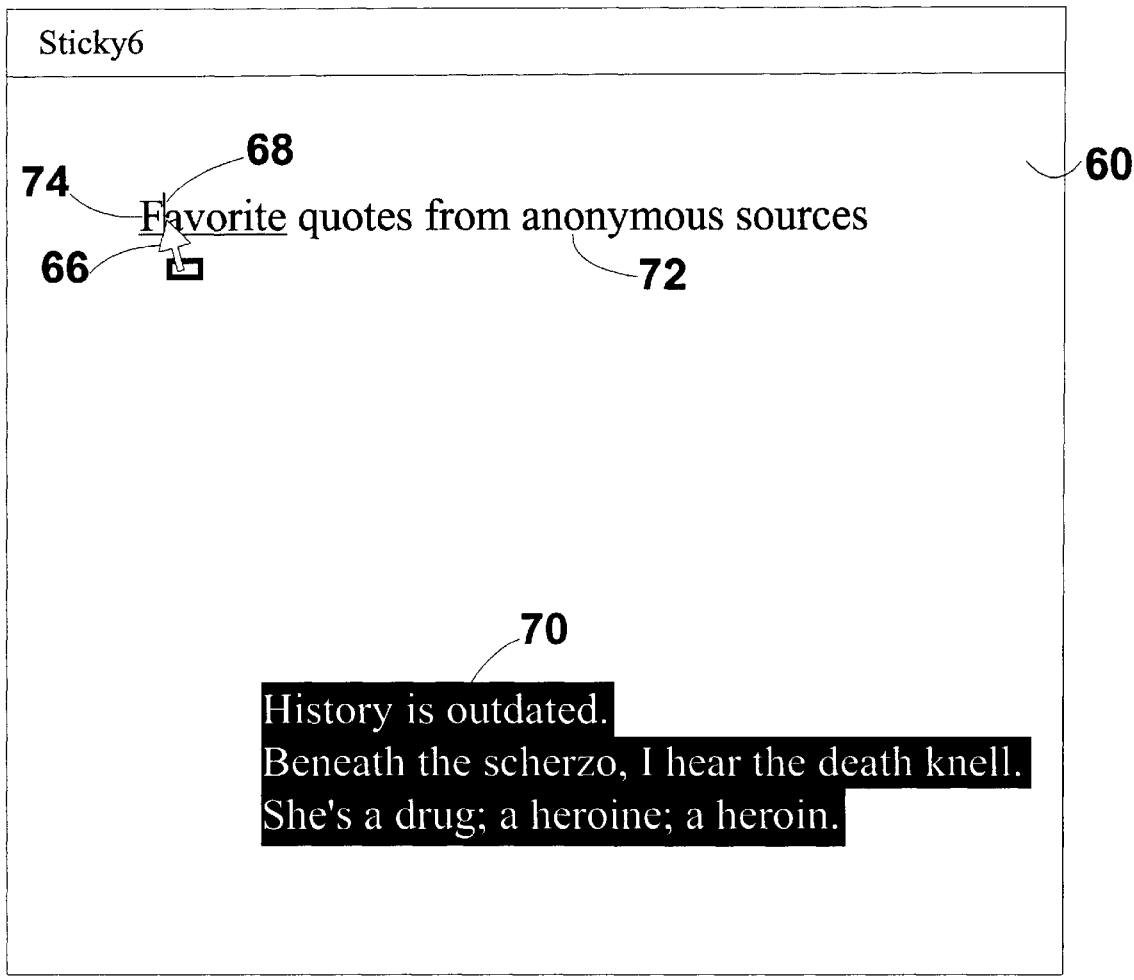
Figure 8B:
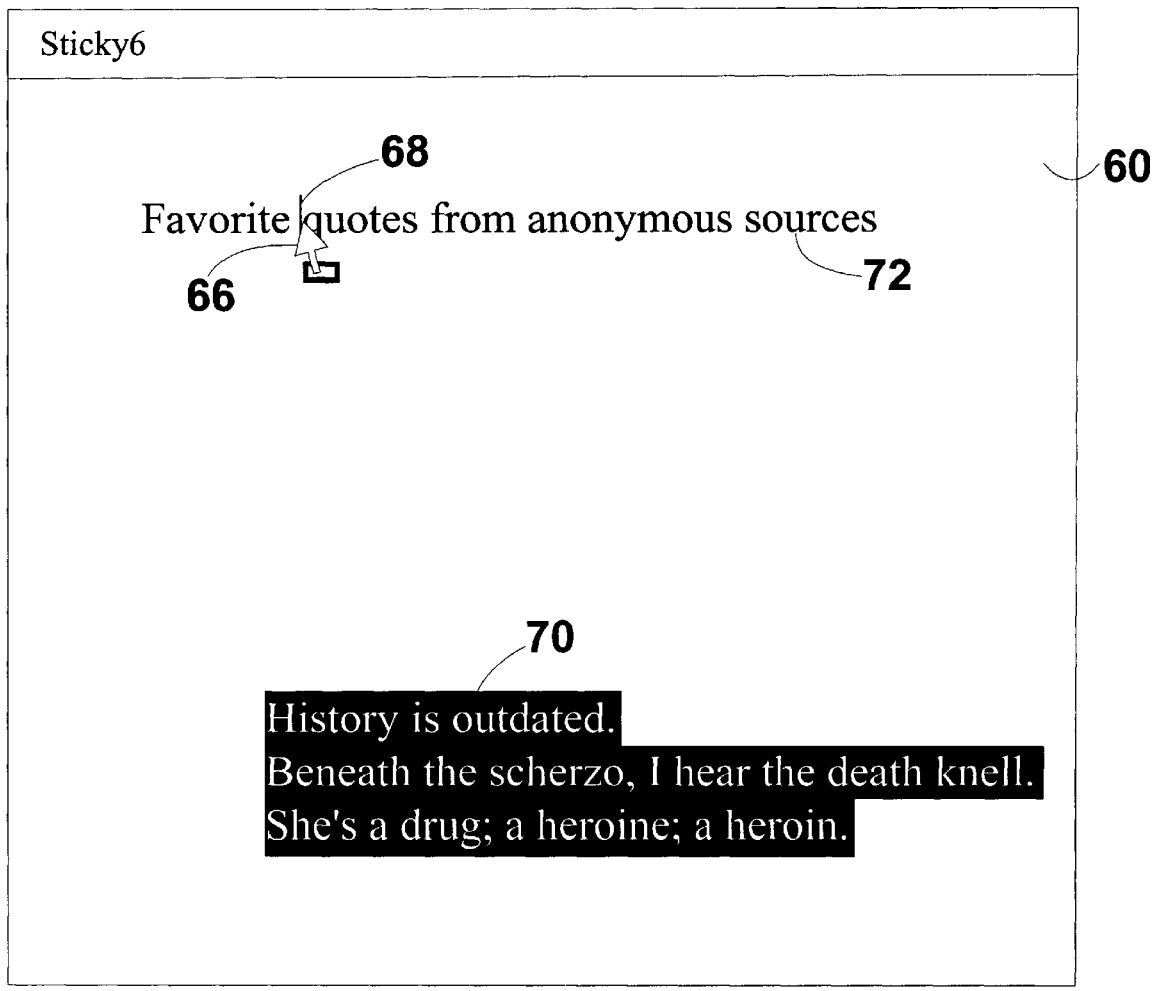
Figure 8C:
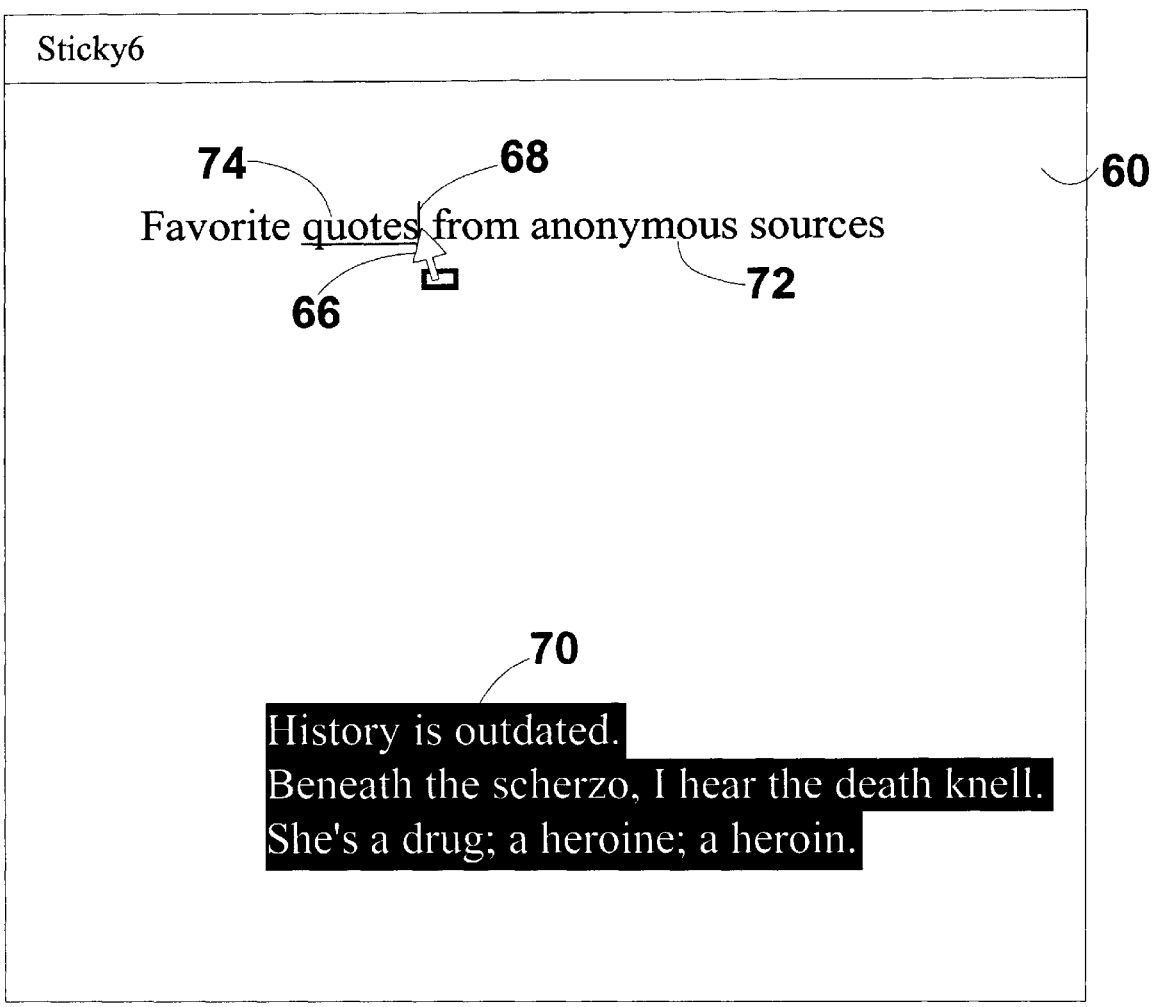
Figure 8D:
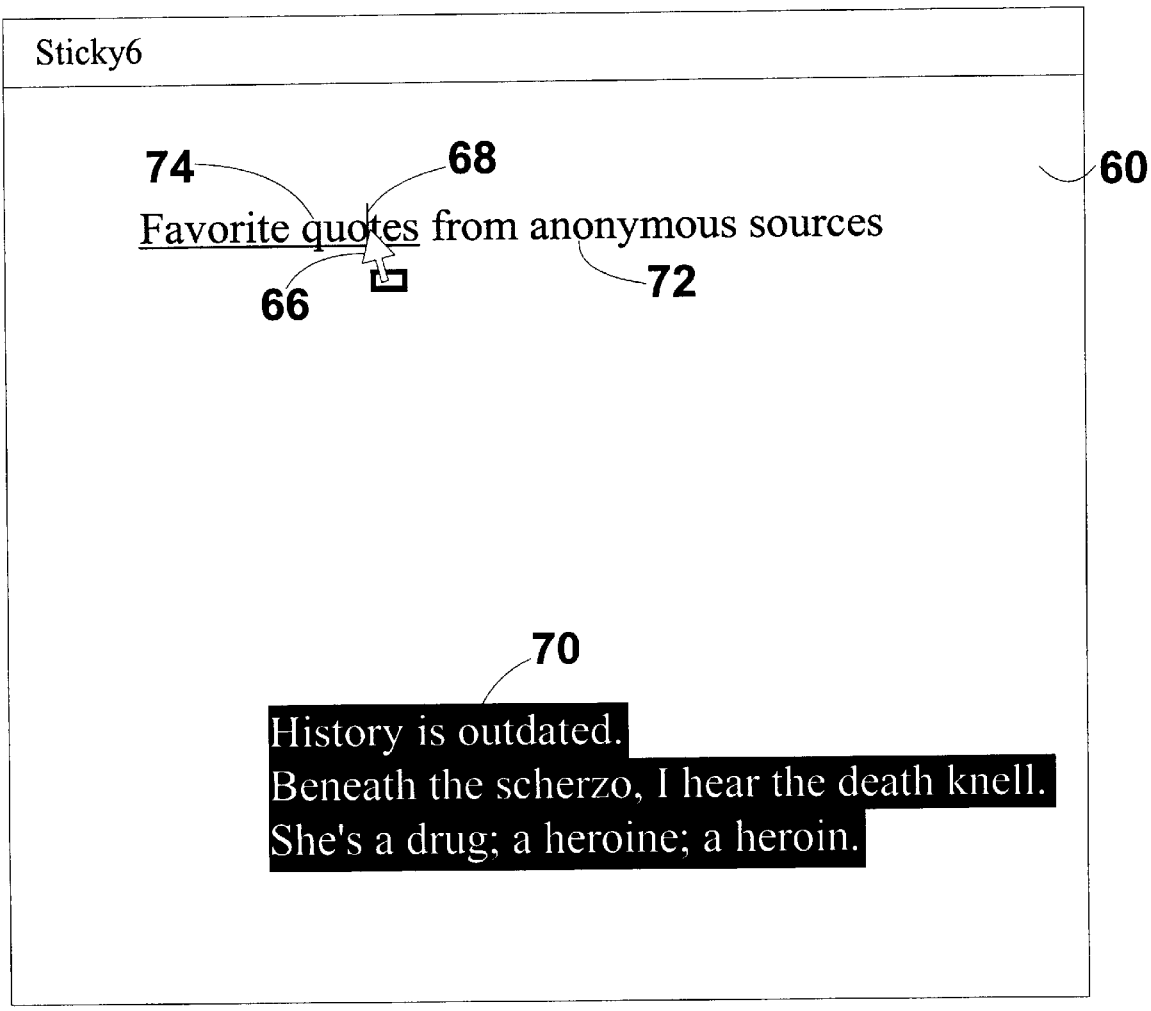

In the preferred embodiment of the present invention, a second predetermined signal from a predetermined key, defined herein by depressing the Shift key, enables the user to conveniently trigger the drag and link operation as opposed to the conventional drag and drop operation. FIG. 8A illustrates the display screen when the pointer 66 is positioned over the target-visual element 72 where the selected source-visual element 70 is to be dropped via the pointer and the keyboard Shift key is simultaneously depressed. When the Shift key is depressed while the pointer 66 is over the target-visual element 72, the process calculates the precise sub-location of a hyperlink-visual element (HVE) 74 based on the location of the pointer 66 within the target-visual element 72. The hyperlink-visual element 74, in this case defined as the word "Favorite", demarcates the visual boundaries where a hyperlink will be created within the target-visual element 72 once the user releases the primary mouse button 12 (FIG. 1). The hyperlink-visual element 74 is visually accentuated to clearly distinguish it from surrounding objects and to emphasize its precise location within the target-visual element. Policy for defining the hyperlink-visual element and method of visually accentuating the hyperlink-visual element may be specific to the target-visual element. In some cases, boundaries of the hyperlink-visual element may share the boundaries of the target-visual element. In the specific case where the target-visual element is a text area-visual element, the present invention enables the user to readily demarcate any string of text within the text area as the hyperlink-visual element. This process of demarcating a string of text within the text area is further illustrated in FIG. 8B and FIG. 8C: When the pointer 66 is over a text area-visual element 72 and the Shift key is depressed, an initial character index currently nearest the pointer is duly noted, in FIG. 8B this is the character "q" of the word "quotes" appearing adjacent to the insertion point 68. As the pointer subsequently moves over the text area while the Shift key is depressed, the character index nearest the pointer is constantly calculated and any characters between the current character index and the initial character index demarcate a string of text that defines the hyperlink-visual element. As shown in FIG. 8C, the current character index is the character "s" appearing adjacent to the insertion point 68 and thus the string of text from the initial character index of "q" to the character "s" defines the hyperlink-visual element 74. This string of text, the word "quotes", is automatically colored and underlined to clearly distinguish it from surrounding text and to visually accentuate the specific location where a hyperlink will be created within the target-visual element 72 once the user releases the primary mouse button 12 (FIG. 1). If the Shift key is released or the pointer passes outside the text area, the visual appearance of the hyperlink-visual element is restored and the hyperlink-visual element is undefined. The user may subsequently depress the Shift key to reestablish the initial character index. As the pointer again moves over the text area, the character index nearest the pointer is constantly recalculated and the characters between the current character index and the initial character index redefine the hyperlink-visual element. This cycle whereby the user selects a target string as the hyperlink-visual element may repeat until the user releases the primary mouse button 12 and initiates the next step of the drag and link process. As a convenient optimization to help the user quickly select a string of words for the hyperlink-visual element, individual words within the text area, demarcated by word breaks such as spaces spanning the insertion point 68, may be automatically calculated from the pointer position. In order to define a string of words as the hyperlink-visual element, the process calculates an initial word selection spanning the character index nearest the pointer at the time the Shift key is depressed; the initial word selection being demarcated by word breaks such as spaces. The initial word selection is then visually accentuated. As the pointer is moved by the user while the primary mouse button 12 is depressed and the Shift key is depressed, the string of text comprising the words located between the initial word selection and the word selection spanning the character index nearest pointer are visually accentuated. For example, as shown in FIG. 8D, where the word "Favorite" is initially identified as the initial word selection comprising the hyperlink-visual element 74 within the text area-visual element 72, once the pointer passes from the word "Favorite" to a location over any part of the word "quotes", the process calculates the start and end character indexes for the word "quotes" and the entire string of words, "Favorite quotes" immediately becomes the hyperlink-visual element 74 and is immediately visually accentuated with underlining and color. Users skilled in the art will appreciate the familiar ease of such techniques for defining the hyperlink-visual element within a text area, comparing the techniques to well known, conventional text selection techniques and automatic word selection techniques found in conventional word processing systems.

The hypermedia processing system suitable for practicing the preferred embodiment of the present invention is implemented using the Microsoft Win32 API for use on Windows 95, Windows 98, and Windows NT 4.0 operating systems. In this hypermedia processing system, a particular word within a text area is calculated by first obtaining the zero based index of the text character nearest the pointer screen coordinates and then locating word break indexes spanning this index. The span of characters between the word breaks identifies the individual word beneath the pointer screen coordinates and this word may serve as a potential hyperlink-visual element. Those skilled in the art will easily understand the following C++ code implemented by this hypermedia processing system to identify words in a text area as the pointer moves over the text area:

```
// get current position of pointer in client coordinates
POINT currentPoint;
::GetPointerPos(¤tPoint);
::ScreenToClient(m_hWnd, ¤tPoint);
// find zero based index of character nearest pointer
// where m_hWnd is a rich edit control text area
int index;
index = ::SendMessage(m_hWnd,
EM_CHARFROMPOS,0,(LONG)¤tPoint);
// find word breaks spanning index
int begin;
int end;
if (::SendMessage(m_hWnd, EM_FINDWORDBREAK, WB_ISDELIMITER,
     index)) {
        begin = index;
        end = index;
}
else {
    if (::SendMessage(m_hWnd, EM_FINDWORDBREAK,
        WB_ISDELIMITER, index – 1))
            begin = index;
    else
        begin = ::SendMessage(m_hWnd, EM_FINDWORDBREAK,
            WB_MOVEWORDLEFT, index);
```

-continued

```
    end = ::SendMessage(m__hWnd, EM__FINDWORDBREAK,
    WB__MOVEWORDRIGHT, index);
    if (::SendMessage(m__hWnd, EM__FINDWORDBREAK,
    WB__ISDELIMITER, end – 1))
        end = end – 1;
}
```

Figure 9:
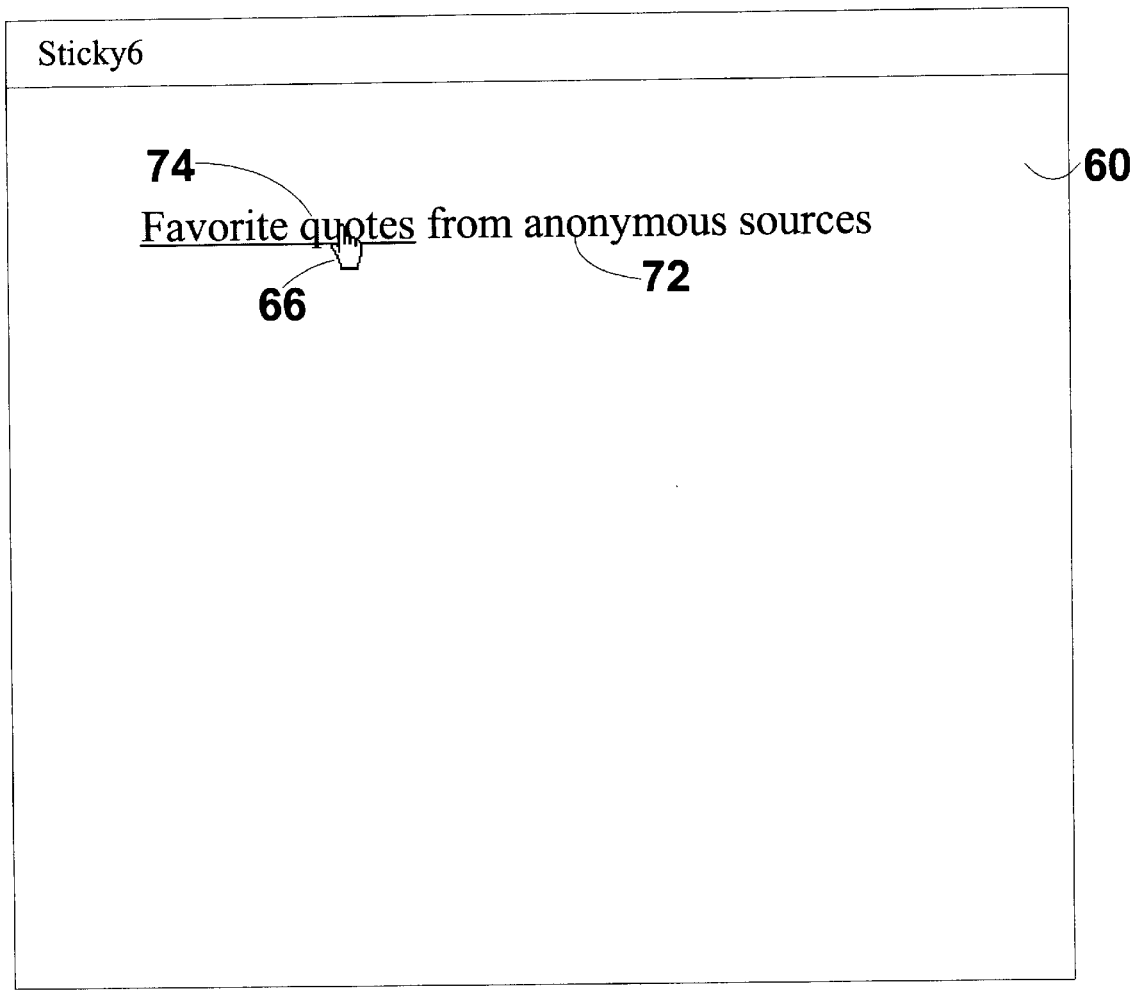

The drag and link process continues in FIG. 9 which shows the display screen once the primary mouse button 12 is released while the Shift key is depressed and the pointer is over the hyperlink-visual element 74 inside the text area-visual element 72. In accordance with the present invention, when the user triggers a third predetermined signal, defined herein by releasing the primary mouse button 12, while the Shift key is depressed and the hyperlink-visual element 74 is defined, a new document is automatically created and the source object 46 associated with the source-visual element 70 is moved into this new document. In addition to the creation of a new document, a hyperlink is automatically created connecting the hyperlink-visual element 74 to the new document; as the destination of the hyperlink, the new document is thus "hyperlinked". The hyperlink-visual element 74 remains colored and underlined to visually accentuate the location of the newly created hyperlink. The pointer 66 changes to the hyperlink hand shape to indicate that the hyperlink may be resolved when the user subsequently depresses the primary mouse button 12 while the pointer 66 is over the hyperlink-visual element 74 containing the newly created hyperlink. In the hypermedia processing system suitable for practicing the preferred embodiment of the present invention, one hyperlink-visual element 74 may serve as the target destination for multiple drag and link operations and thus connect to many hyperlinked documents.

Figure 10:
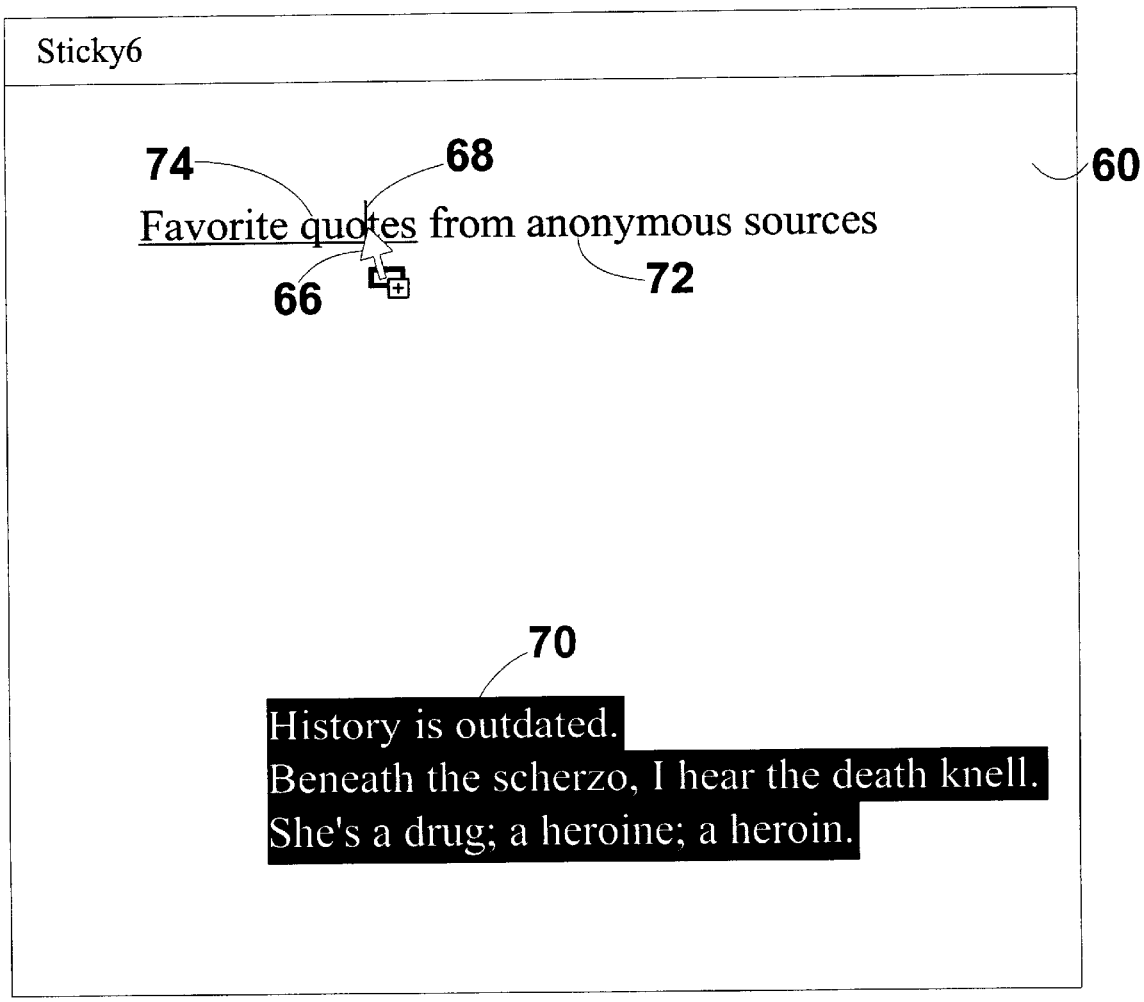
Figure 11:
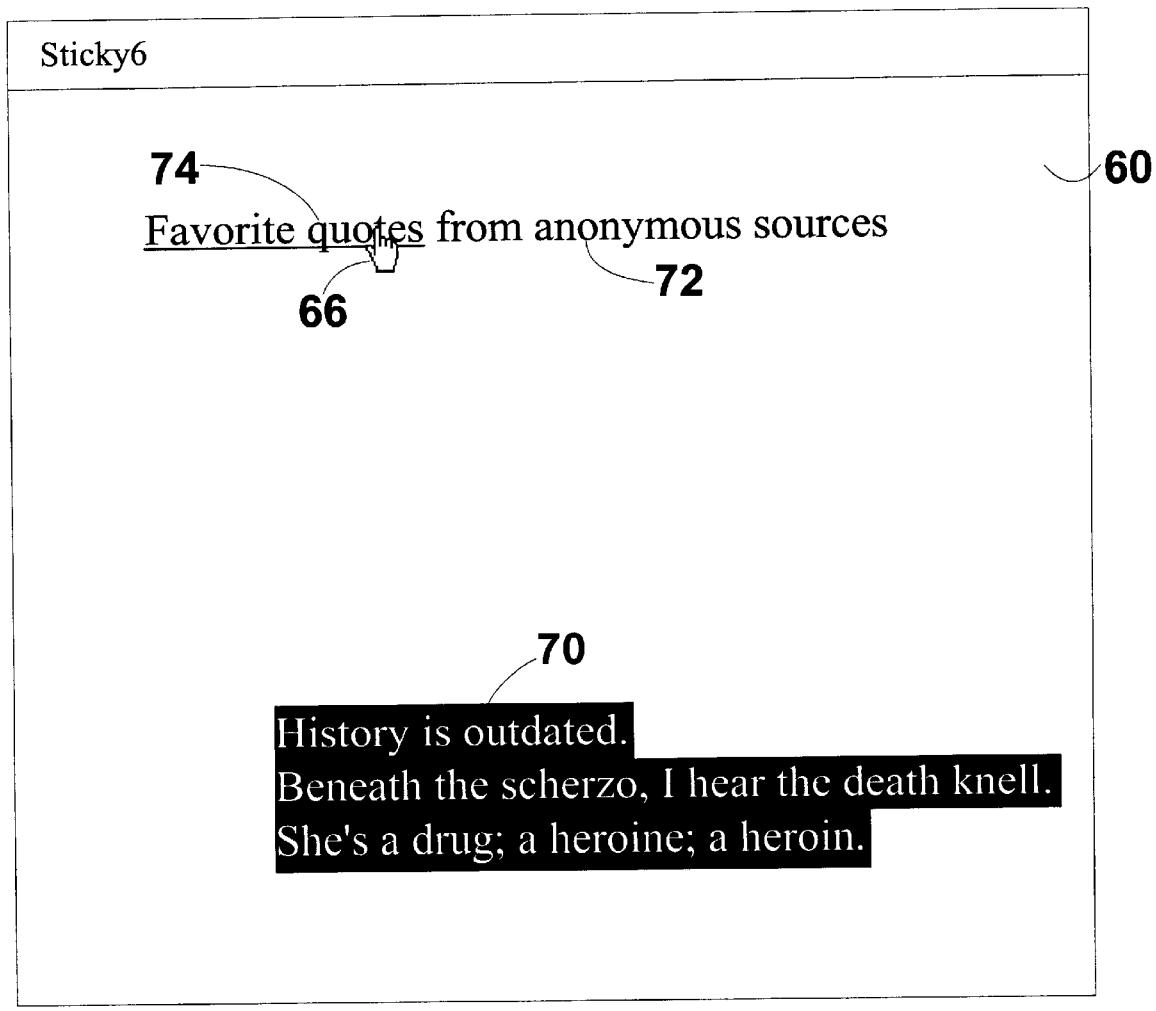

If a predetermined modifier key is depressed when the primary mouse button 12 is released, the source object 46 and its associated source-visual element 70 (FIG. 5) can be copied instead of moved. As shown in FIG. 9, without the predetermined modifier key depressed, the process performs a default move operation on the source object 46, transferring the source object 46 from its original document location into the newly created document and removing the associated source-visual element 70 (FIG. 5) from the original view. FIG. 10 shows the display screen as the primary mouse button 12 is depressed while the Shift key and the predetermined modifier key, the Control key, are both depressed and the pointer 66 is positioned over the hyperlink-visual element 74 inside the text area-visual element 72. The pointer 66 shape is set to a slanted arrow and a box with a plus sign to indicate that the source object 46 is to be copied when the primary mouse button 12 is released. FIG. 11 shows the display screen as the primary mouse button 12 is released while the Shift key and the Control key are both depressed and the source-visual element 70 is dropped via the pointer 66 onto the hyperlink-visual element 74 inside the text area-visual element 72. Here, pressing the Control key, causes the drag and link operation to create a new document containing a copy of the source object 46 associated with the source-visual element 70, leaving the source object 46 and its associated source-visual element 70 intact. A hyperlink is automatically created connecting the hyperlink-visual element 74 and the newly created document. The hyperlink-visual element 74 remains colored and underlined to visually accentuate the location of the newly created hyperlink, and the pointer 66 changes to the hyperlink hand shape.

Figure 12:
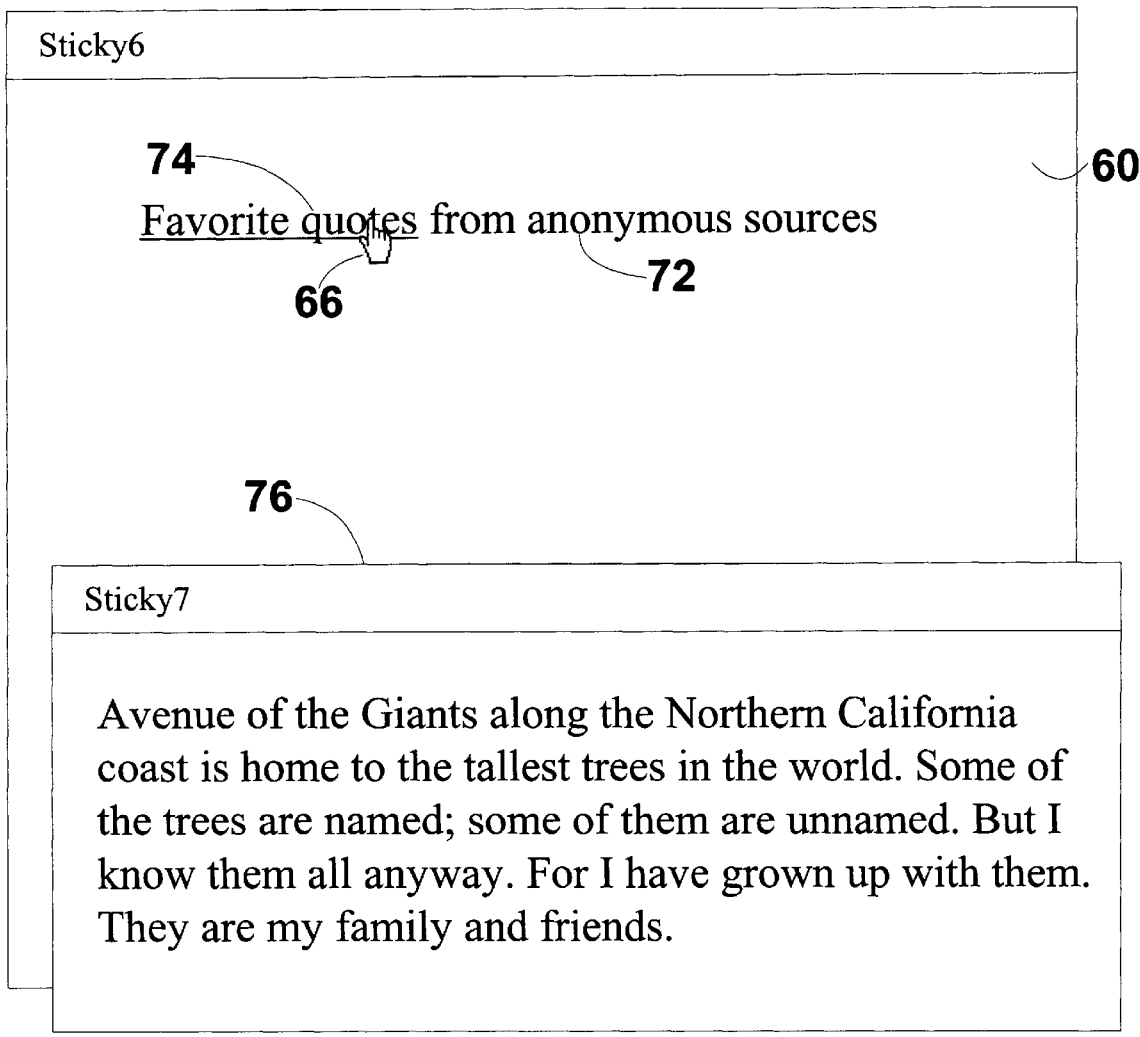

In accordance with the present invention, FIG. 12 illustrates the drag and link process in the specific case where the selected source object is a document versus a component, a component being an element of a document rather than the document itself. In the hypermedia processing system suitable for practicing the preferred embodiment of the present invention, a document is rendered in a hypermedia processing window 76 called a sticky. Here, when the primary mouse button 12 is released while the Shift key is depressed and the sticky 76 is dropped via the pointer onto a hyperlink-visual element 74 inside a text area-visual element 72, a new document is not created; only a hyperlink is created connecting the hyperlink-visual element 74 within the target-visual element 72 to the document associated with the sticky 76. The pointer 66 changes to the hyperlink hand shape. Because the sticky 76 is already associated with a preexisting document, it is unnecessary for the drag and link operation to create a new document and to redundantly transfer the contents of the source object document associated with the sticky. If the user wishes to explicitly create a copy of the source object document, pressing the predetermined modifier Control key during the drag and link operation will create a new document containing a copy of the source object document. In the hypermedia processing system suitable for practicing the preferred embodiment of the present invention, the user can thus first create a document rendered by a sticky and then subsequently create hyperlinks to that preexisting document in a fashion that requires little effort on the part of the user.

In accordance with the present invention, both source and target-visual elements are not merely limited to text elements. The preferred embodiment of the present invention details the specific case where the target-visual element is a text area and the specific case where the source object is a preexisting document rendered by a sticky source-visual element; however, source and target-visual elements may include any directly manipulated object in a graphical user interface system such as, but not limited to: text, graphics, digital ink as implemented in pen based computer systems, shapes in a drawing or flowcharting system, visual elements of a three dimensional computer interface system, component object technology visual elements such as embedded and linked objects as implemented by Microsoft OLE, ActiveX controls and ActiveX documents, Java Beans, icons, files, folders, and windows. Those skilled in the art will appreciate the applicability of the present invention to any visual element that can be directly manipulated such as any element that can be the target or source of a conventional drag and drop operation.

Figure 13:
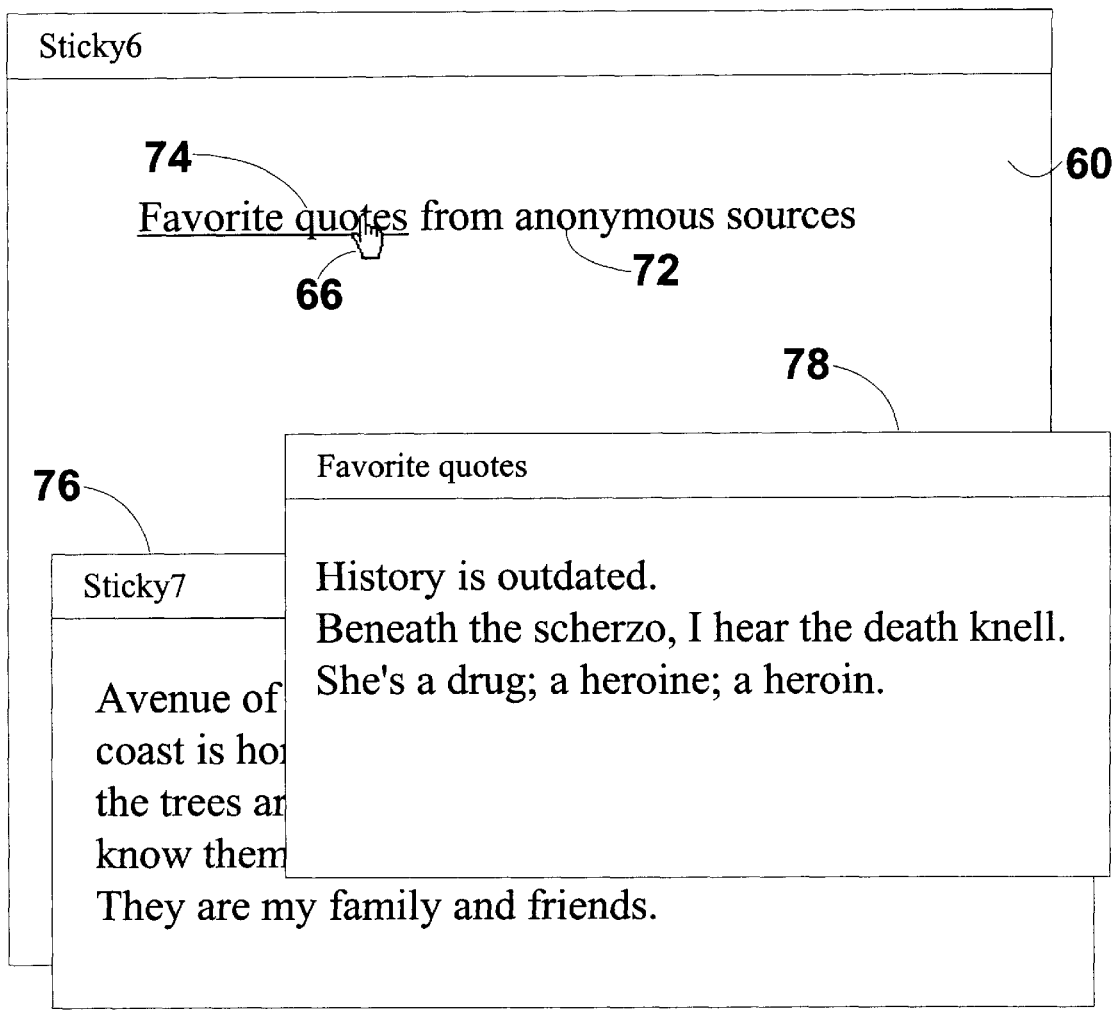

For completeness, FIG. 13 shows the display screen upon hyperlink resolution after the drag and drop operation is completed. When the primary mouse button 12 is depressed while the pointer is over the hyperlink-visual element 74, views associated with each hyperlinked document 76 and 78 are displayed in separate hypermedia processing windows.

For purposes of clarity and comparison, the following flowcharts begin with a review of the conventional drag and drop operation and then provide a detailed process description of the drag and link operation defined herein as the preferred main embodiment of the present invention.

Figure 14:
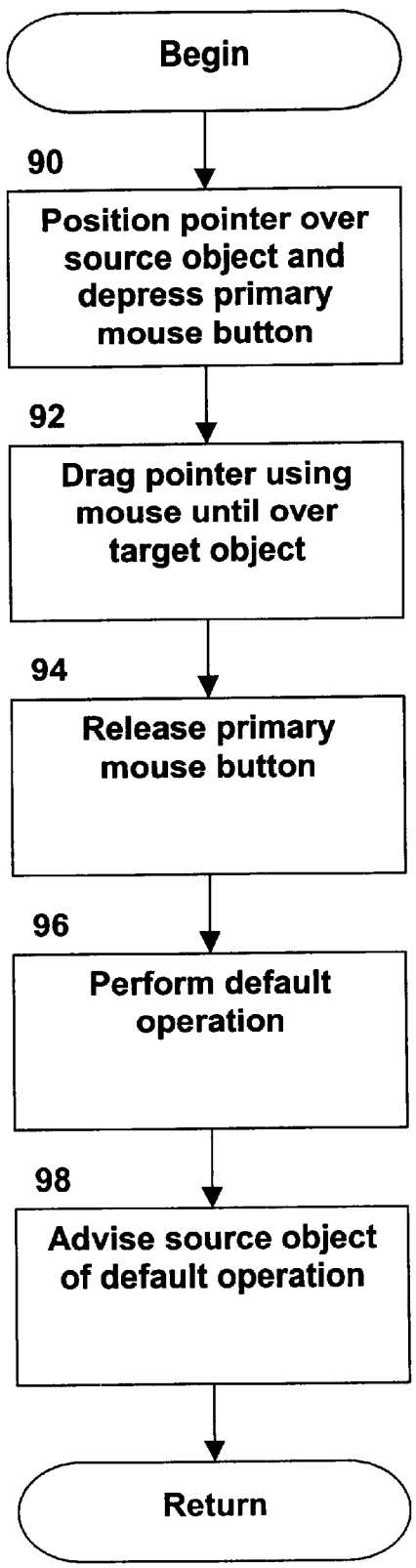
FIG. 14 is a flowchart illustrating the conventional drag and drop process.

FIG. 14 is a flowchart illustrating the steps that are performed in a conventional drag and drop operation using the primary button 12 of the mouse 10. Initially, the user moves the mouse 10 to move the pointer 16 (FIG. 2) on the video display 18 until the pointer is positioned over a source-visual element 20 that is associated with a source object. The user then clicks on the source-visual element 20 by depressing the primary button 12 of the mouse 10, step 90. While keeping the primary button 12 depressed, the user drags the pointer 16 across the video display 18 until the pointer 16 is positioned over a target-visual element 22 that is associated with a target object, step 92. The user then releases the primary button 12 of the mouse 10 to drop the source object onto the target object via the pointer, step 94. Once the user releases the primary button 12, an application default operation is automatically performed, step 96, and the source object associated with the source-visual element 20 is advised of the default operation, step 98.

Figure 15A:
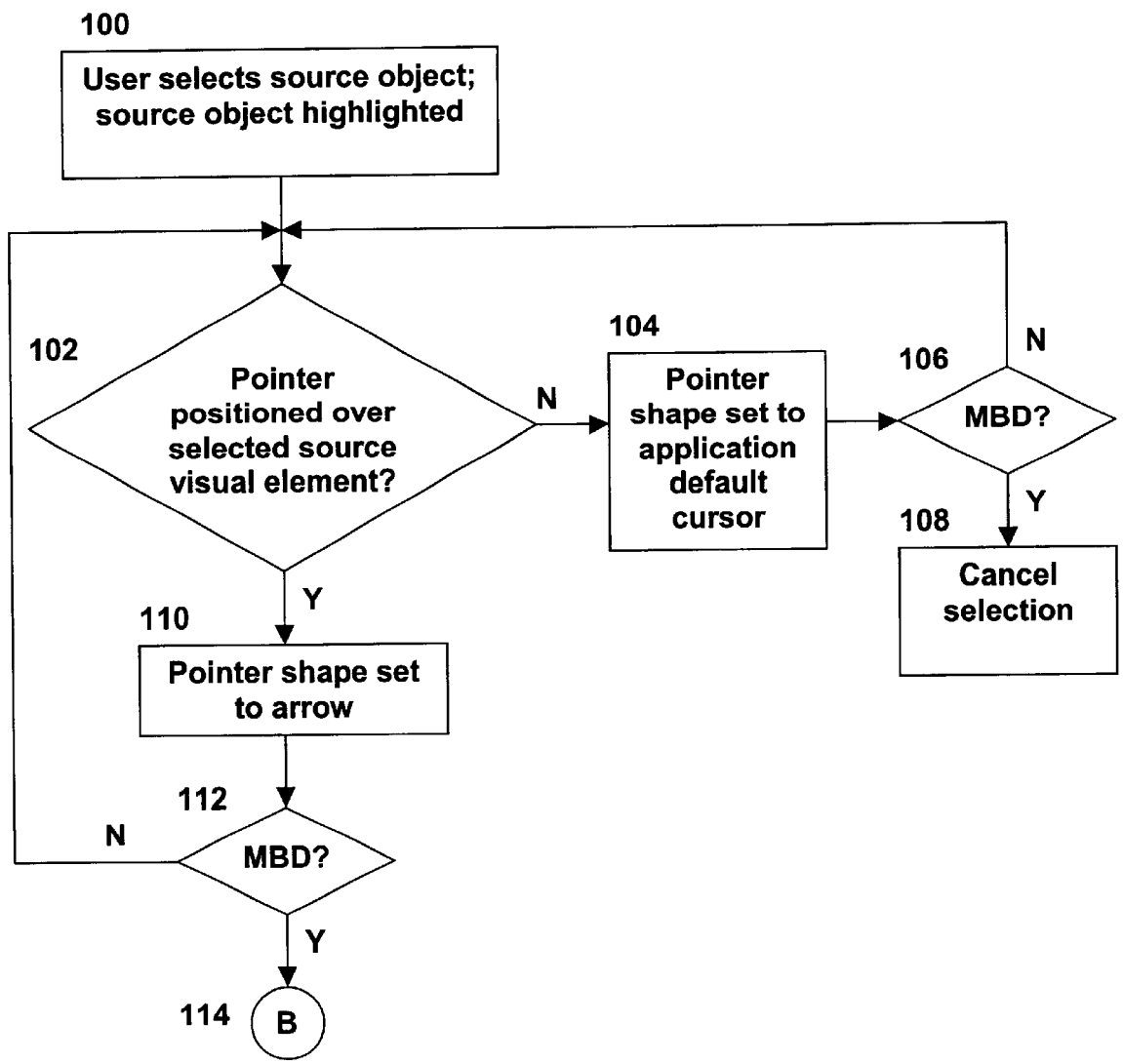
FIGS. 15A–C are flowcharts illustrating the processing logic of the present invention.
Figure 15B:
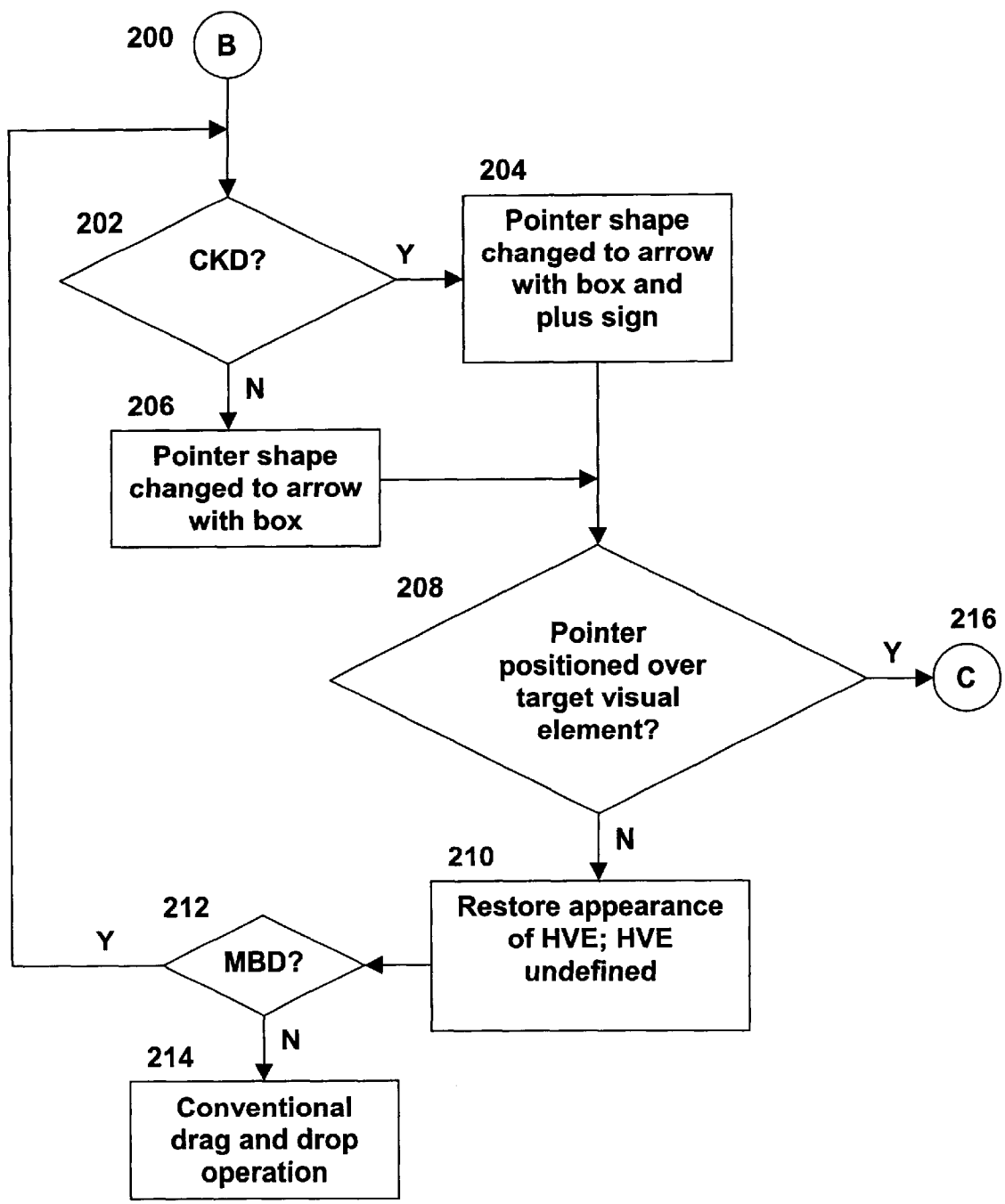
Figure 15C:
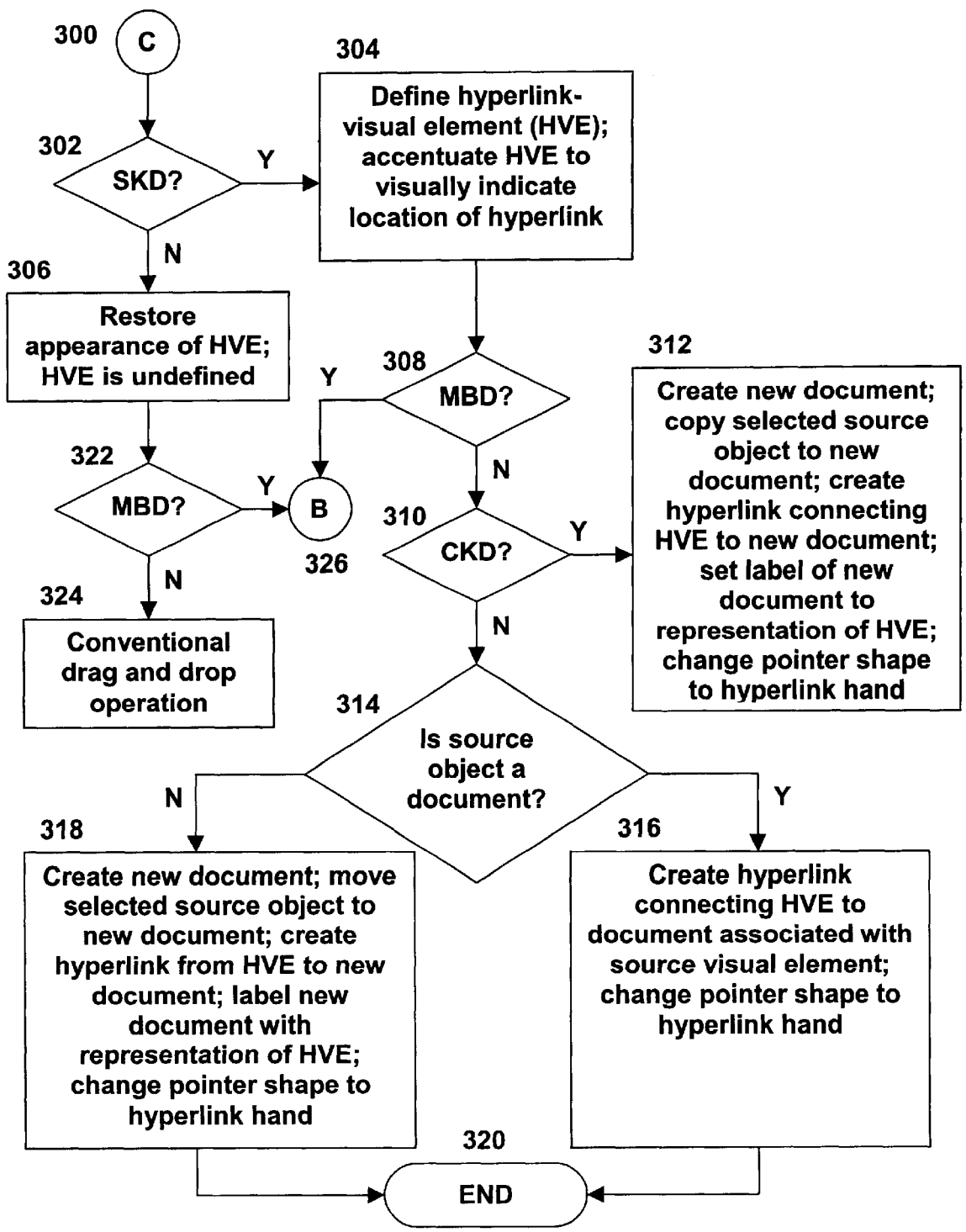

The process of the preferred embodiment of the present invention, the drag and link operation, is described step by step in the flowcharts shown in FIGS. 15A–C. In accordance with the present invention and description herein of the drag and link operation, users skilled in the art will understand that in the following flowcharts, primary mouse button down (MBD), Shift key down (SKD), and Control key down (CKD) are predetermined signals that may be alternatively generated by other user-defined keyboard combinations and/or mouse/stylus operations.

The drag and link process begins with step 100 in FIG. 15A where the user selects a source-visual element 20 (FIG. 2) in the document using the mouse 10 and primary mouse button 12. The selected source-visual element 20 is highlighted. Next, the process continues with step 102, where the process queries whether the pointer 16 is positioned over the selected source-visual element 20. If the pointer is not positioned over the selected source-visual element, the process makes sure in step 104 that the pointer's shape is set to an application default shape and then queries in step 106 whether the primary mouse button 12 is down (MBD). If the primary mouse button 12 is down and the pointer is not positioned over the selected source-visual element, the selection is canceled in step 108, the highlighting disappears and the user may make a new selection. If the process determines in step 106 that the primary mouse button 12 is not down, the process loops back to step 102 to check the position of the pointer. The process determines in step 102 that the pointer is positioned over the selected source-visual element and proceeds to step 110 where the pointer shape is changed. In the preferred embodiment described herein, the pointer changes from its normal application default shape to a slanted arrow. Once the pointer is positioned over the selected source-visual object, the process queries in step 112 whether the first predetermined signal is activated, that is, whether the primary mouse button 12 is down. If the primary mouse button 12 is not down, the process loops back to step 102. If the primary mouse button 12 is down, the process continues on to step 114, phase B.

FIG. 15B shows phase B of the drag and link operation. Here, the primary mouse button 12 is down and the process queries in step 202 whether the user has depressed the predetermined modifier key, the Control key, indicating the copy data transfer operation. If the Control key is down (CKD), the pointer shape changes to a slanted arrow with a box and a plus sign, step 204. If the Control key is not down, the pointer shape changes to a slanted arrow with a box, step 206. After adjusting the pointer shape, the process queries whether the pointer is positioned over the target-visual element 22 (FIG. 2) associated with the target object, step 208. If the pointer is positioned over the target-visual element, then the process proceeds to phase C, step 216. If the pointer is not positioned over the target-visual element, the process restores the visual appearance of any previously defined hyperlink-visual element (HVE) and its associated target-visual element. The process then undefines the hyperlink-visual element, step 210. For example, in the hypermedia processing system suitable for practicing the preferred embodiment of the present invention, when the hyperlink-visual element is a string of text, the string of text is visually accentuated by coloring and underlining the string to clearly distinguish it from surrounding text. If the visual appearance of the text string must be restored, its original color is restored and underlining is removed. From step 210, the process continues with step 212 where the process queries whether the primary mouse button 12 is down. If the primary mouse button 12 is down, the process loops back to the beginning of phase B, step 202. If the primary mouse button 12 is not down, the process defaults to the process of a conventional drag and drop operation, step 214, where drop semantics are application defined.

Users skilled in the art will notice that up to this point, the steps of the drag and link operation are similar to the conventional drag and drop operation. In the preferred embodiment of the present invention, the second predetermined signal, generated by depressing the Shift key, conveniently distinguishes the drag and link operation from the conventional drag and drop operation. FIG. 15C shows phase C of the drag and link process where the pointer is positioned over the target-visual element. Here, the process queries whether the Shift key is down (SKD), step 302. If the Shift key is down, the process defines the hyperlink-visual element (HVE) and visually accentuates the HVE to indicate it is the hyperlink target, step 304. If the Shift key is not down, step 306, the process restores the appearance of any hyperlink-visual element, undefines the hyperlink-visual element, and then queries whether the primary mouse button 12 is still down, step 322. If the primary mouse button 12 is down, the process returns to phase B (FIG. 15B, step 200). If the primary mouse button 12 is not down, the process defaults to the process of a conventional drag and drop operation, step 324, where drop semantics are application defined. Simply pressing the Shift key, or a suitable predetermined alternative, thus enables the user to easily trigger the drag and link operation as opposed to the conventional drag and drop operation.

Continuing process flow from step 304 where the Shift key is down and the hyperlink-visual element is defined, the process then queries whether the primary mouse button 12 is down (MBD), step 308. If the primary mouse button 12 is down, the process returns to phase B (FIG. 15B, step 200). If the primary mouse button 12 is not down, the process queries whether the Control key is down (CKD), step 310. If the Control key is down, step 312, the process automatically creates a new document, copies the selected source object to this new document leaving the original source object and its associated source-visual element intact, creates a hyperlink connecting the hyperlink-visual element to the newly created document, sets the document label to a representation of the hyperlink-visual element, and changes the pointer shape to a hyperlink hand. If the Control key is not down, step 314, the process checks for the specific case where the source-visual element is a sticky associated with a document source object. If the source object is a document, step 316, the process creates a hyperlink connecting the hyperlink-visual element and the document, and changes the pointer shape to a hyperlink hand. If the source object is a component within an existing document rather than a document, step 318, the process automatically creates a new document, moves the selected source object to this new document, removes the source object and its associated source-visual element, creates a hyperlink connecting the hyperlink-visual element to the newly created document, sets the document label to a representation of the hyperlink-visual element, and changes the pointer shape to a hyperlink hand.

The state of the predetermined modifier key, Control key, at the time the user releases the primary mouse button 12, step 310, determines whether the selected source object is moved or copied by the drag and link operation. In the hypermedia processing system suitable for practicing the preferred embodiment of the present invention, where the hyperlink-visual element is a string of text in a text area, the process sets the label of any automatically created document to the hyperlink-visual element text string using a default font color and font size. Thus, when the view of the document is subsequently displayed in a hypermedia processing window or sticky, the window label reflects the origin of the hyperlink.

Figure 16:
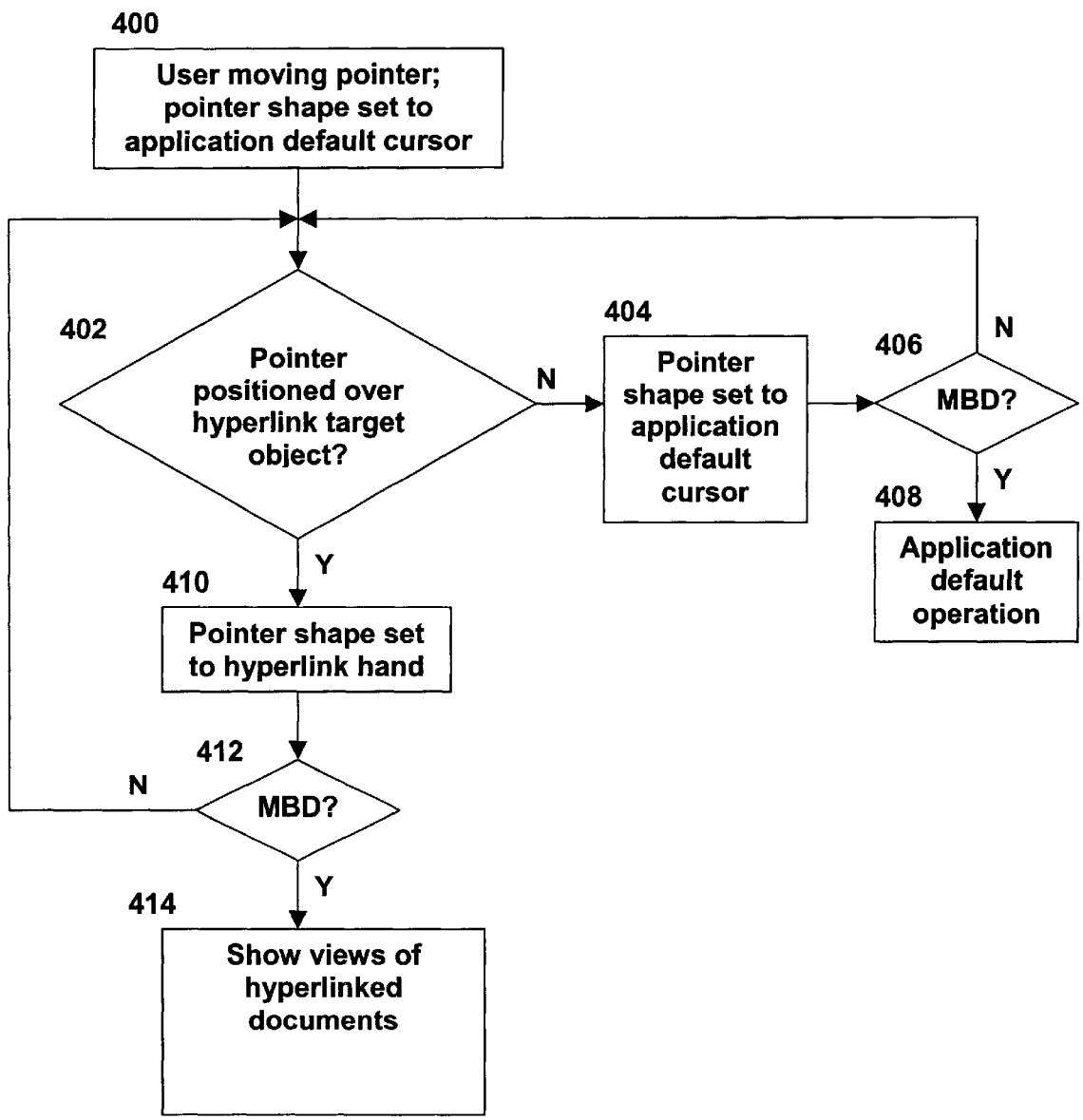
FIG. 16 is a flowchart illustrating hyperlink resolution.

FIG. 16 shows the process of hyperlink resolution after a hyperlink has been created by the drag and link operation defined herein as the preferred embodiment of the present invention. Here, the process begins with step 400 with the pointer set to an application default shape while the user moves the mouse pointer. If the pointer is positioned over a hyperlink-visual element, step 402, the pointer shape changes to a hyperlink hand, step 410. If the primary mouse button 12 is depressed while over the hyperlink-visual element, step 412, the process resolves the hyperlinks associated with the hyperlink-visual element and displays a view of each hyperlinked document in a separate hypermedia processing window, step 414. If the primary mouse button 12 is not depressed while over the target hyperlink, the process returns to step 402. Continuing from step 402, if the pointer is not positioned over a hyperlink target, the process makes sure the pointer shape is restored to the application default shape, step 404, and the process then queries whether the primary mouse button 12 is down (MBD), step 406. If the primary mouse button 12 is not down, the process returns to step 402. If the primary mouse button 12 is down, the process defaults to application defined semantics, step 408. This process of hyperlink resolution will be familiar to users skilled in the art.

CONCLUSIONS, RAMIFICATIONS, AND SCOPE OF INVENTION

Those skilled in the art will understand how the method and system defined herein enables the user to effortlessly create hyperlinks and hyperlinked documents from the direct manipulation of information in a fashion that is vastly simpler than the cumbersome methods offered by prior art systems. In one seamless motion, the user can select, drag, and drop a source-visual element associated with a source object onto a specific location within a target-visual element associated with a target object, automatically creating a new document containing the source object and automatically creating a hyperlink connecting the target object and the new document. The drag and link operation defined herein simplifies hypermedia document creation.

While the earlier description contains many specific details, these should not be construed as limitations on the scope of the invention, but rather as an exemplification of one preferred embodiment thereof. Accordingly, the scope of the invention should be determined not solely by the embodiment illustrated, but also by the appended claims and their legal equivalents.

I claim:

1. In a data processing system having an input device and a video display, a method for creating hyperlinks and hyperlinked documents, comprising the steps of:

(a) displaying a source-visual element that is associated with a source object, a target-visual element that is associated with a target object, and a pointer on the video display;

(b) selecting the source-visual element for movement in response to a user positioning the pointer over the source-visual element and activating a first predetermined signal using the input device;

(c) moving the pointer on the video display in response to use of the input device by the user so that the pointer is displayed on the video display over the target-visual element while the first predetermined signal is maintained;

(d) defining a hyperlink-visual element within the target-visual element in response to a second predetermined signal initiated by the user while the pointer is over the target-visual element and the first predetermined signal is maintained;

(e) receiving a third predetermined signal in response to use of the input device by the user while the second predetermined signal is maintained and the hyperlink-visual element is defined; and (f) in response to the third predetermined signal, determining the type of data transfer operation chosen by the user, either a copy data transfer operation or a move data transfer operation; and (g) determining the type of source object selected for transfer, either a document type or a component type, a component being an element of a document rather than the document itself; and (h) in response to the copy data transfer operation being chosen by the user:
   i. creating a new document;
   ii. copying the source object to the new document;
   iii. creating a hyperlink connecting the hyperlink-visual element to the new document, the document thus being hyperlinked;
   iv. labeling the new document with a representation of the hyperlink-visual element;
   v. altering the appearance of the pointer to provide visual feedback to the user indicating the hyperlink is created, connecting the hyperlink-visual element to the new document; or (i) in response to the move data transfer operation being chosen by the user and the source object is the component type:
   i. creating a new document;
   ii. moving the source object to the new document;
   iii. removing the source-visual element;
   iv. creating a hyperlink connecting the hyperlink-visual element to the new document, the document thus being hyperlinked;
   v. labeling the new document with a representation of the hyperlink-visual element;
   vi. altering the appearance of the pointer to provide visual feedback to the user indicating the hyperlink is created, connecting the hyperlink-visual element to the new document; or (j) in response to the move data transfer operation being chosen by the user and the source object is the document type:
   i. creating a hyperlink connecting the hyperlink-visual element to the document associated with the source object, the document thus being hyperlinked;
   ii. altering the appearance of the pointer to provide visual feedback to the user indicating the hyperlink is created, connecting the hyperlink-visual element to the document.

2. The method of claim 1, wherein defining a hyperlink-visual element within the target-visual element further comprises the following steps in the specific case where the target-visual element is a text area:
   (a) calculating an initial character index within the text area nearest the pointer at the time the second predetermined signal is received;
   (b) accentuating the string of text located between the initial character index and the character index calculated to be nearest the pointer as the pointer is moved by the user while the second predetermined signal and the first predetermined signal are maintained.

3. The method of claim 2, wherein accentuating the string of text comprises underlining the string of text and coloring the string of text to distinguish the string of text from any surrounding text.

4. The method of claim 1, wherein defining a hyperlink-visual element within the target-visual element, in the specific case where the target-visual element is a text area, is optimized for word selection further comprising the steps of:
   (a) calculating an initial word selection spanning the character index within the text area nearest the pointer at the time the second predetermined signal is received; the initial word selection being demarcated by word breaks;
   (b) accentuating the string of text comprising the initial word selection;
   (c) accentuating the string of text comprising the words located between the initial word selection and the word selection spanning the character index nearest the pointer as the pointer is moved by the user while the second predetermined signal and the first predetermined signal are maintained.

5. The method of claim 4, wherein accentuating the string of text comprises underlining the string of text and coloring the string of text to distinguish the string of text from any surrounding text.

6. The method of claim 1, wherein the source-visual element and the target-visual element comprise directly manipulated objects in a graphical user interface system including, but not limited to: text, graphics, digital ink as implemented in pen based computer systems, shapes in a drawing or flowcharting system, visual elements of a three dimensional computer interface system, component object technology visual elements including embedded and linked objects as implemented by Microsoft COM, Active X controls and Active X documents, Java Beans, icons, files, documents, folders, windows, or any element that can be the target or source of a conventional drag and drop operation.

7. The method of claim 1, wherein labeling the new document with a representation of the hyperlink-visual element, in the specific case where the hyperlink-visual element is a string of text, comprises titling the new document with the text comprising the hyperlink-visual element.

8. The method of claim 1, wherein the first predetermined signal comprises depressing a primary mouse button, the third predetermined signal comprises releasing the primary mouse button, the second predetermined signal comprises depressing a predetermined key, and the predetermined key is a Shift key.

9. The method of claim 1, wherein in response to the third predetermined signal, determining the type of data transfer operation chosen by the user, either a copy data transfer operation or a move data transfer, comprises determining if the user depressed a predetermined modifier key to indicate the copy data transfer operation.

10. The method of claim 9, wherein the predetermined modifier key is a Control key.

11. A computer-readable storage medium having computer executable instructions for creating hyperlinks and hyperlinked documents, performing steps comprising:
   (a) displaying a source-visual element that is associated with a source object, a target-visual element that is associated with a target object, and a pointer on the video display;
   (b) selecting the source-visual element for movement in response to a user positioning the pointer over the source-visual element and activating a first predetermined signal using the input device;
   (c) moving the pointer on the video display in response to use of the input device by the user so that the pointer is displayed on the video display over the target-visual element while the first predetermined signal is maintained;
   (d) defining a hyperlink-visual element within the target-visual element in response to a second predetermined signal initiated by the user while the pointer is over the target-visual element and the first predetermined signal is maintained;
   (e) receiving a third predetermined signal in response to use of the input device by the user while the second predetermined signal is maintained and the hyperlink-visual element is defined; and
   (f) in response to the third predetermined signal, determining the type of data transfer operation chosen by the user, either a copy data transfer operation or a move data transfer operation; and
   (g) determining the type of source object selected for transfer, either a document type or a component type, a component being an element of a document rather than the document itself; and
   (h) in response to the copy data transfer operation being chosen by the user:
      i. creating a new document;
      ii. copying the source object to the new document;
      iii. creating a hyperlink connecting the hyperlink-visual element to the new document, the document thus being hyperlinked;
      iv. labeling the new document with a representation of the hyperlink-visual element;
      v. altering the appearance of the pointer to provide visual feedback to the user indicating the hyperlink is created, connecting the hyperlink-visual element to the new document; or
   (i) in response to the move data transfer operation being chosen by the user and the source object is the component type:
      vii. creating a new document;
      viii. moving the source object to the new document;
      ix. removing the source-visual element;
      x. creating a hyperlink connecting the hyperlink-visual element to the new document, the document thus being hyperlinked;

xi. labeling the new document with a representation of the hyperlink-visual element;

xii. altering the appearance of the pointer to provide visual feedback to the user indicating the hyperlink is created, connecting the hyperlink-visual element to the new document; or (j) in response to the move data transfer operation being chosen by the user and the source object is the document type:

i. creating a hyperlink connecting the hyperlink-visual element to the document associated with the source object, the document thus being hyperlinked;

ii. altering the appearance of the pointer to provide visual feedback to the user indicating the hyperlink is created, connecting the hyperlink-visual element to the document.

12. The computer-readable storage medium of claim 11, wherein defining a hyperlink-visual element within the target-visual element further comprises the following steps in the specific case where the target-visual element is a text area:

(a) calculating an initial character index within the text area nearest the pointer at the time the second predetermined signal is received;

(b) accentuating the string of text located between the initial character index and the character index calculated to be nearest the pointer as the pointer is moved by the user while the second predetermined signal and the first predetermined signal are maintained.

13. The computer-readable storage medium of claim 12, wherein accentuating the string of text comprises underlining the string of text and coloring the string of text to distinguish the string of text from any surrounding text.

14. The computer-readable storage medium of claim 11, wherein defining a hyperlink-visual element within the target-visual element, in the specific case where the target-visual element is a text area, is optimized for word selection further comprising the steps of:

(a) calculating an initial word selection spanning the character index within the text area nearest the pointer at the time the second predetermined signal is received; the initial word selection being demarcated by word breaks;

(b) accentuating the string of text comprising the initial word selection;

(c) accentuating the string of text comprising the words located between the initial word selection and the word selection spanning the character index nearest the pointer as the pointer is moved by the user while the second predetermined signal and the first predetermined signal are maintained.

15. The computer-readable storage medium of claim 14, wherein accentuating the string of text comprises underlining the string of text and coloring the string of text to distinguish the string of text from any surrounding text.

16. The computer-readable storage medium of claim 11, wherein the source-visual element and the target-visual element comprise directly manipulated objects in a graphical user interface system including, but not limited to: text, graphics, digital ink as implemented in pen based computer systems, shapes in a drawing or flowcharting system, visual elements of a three dimensional computer interface system, component object technology visual elements including embedded and linked objects as implemented by Microsoft COM, Active X controls and Active X documents, Java Beans, icons, files, documents, folders, windows, or any element that can be the target or source of a conventional drag and drop operation.

17. The computer-readable storage medium of claim 11, wherein labeling the new document with a representation of the hyperlink-visual element, in the specific case where the hyperlink-visual element is a string of text, comprises titling the new document with the text comprising the hyperlink-visual element.

18. The computer-readable storage medium of claim 11, wherein the first predetermined signal comprises depressing a primary mouse button, the third predetermined signal comprises releasing the primary mouse button, the second predetermined signal comprises depressing a predetermined key, and the predetermined key is a Shift key.

19. The computer-readable storage medium of claim 11, wherein in response to the third predetermined signal, determining the type of data transfer operation chosen by the user, either a copy data transfer operation or a move data transfer, comprises determining if the user depressed a predetermined modifier key to indicate the copy data transfer operation.

20. The computer-readable storage medium of claim 19, wherein the predetermined modifier key is a Control key.

* * * * *